United States Patent
Zhang et al.

(10) Patent No.: US 11,971,992 B2
(45) Date of Patent: Apr. 30, 2024

(54) FAILURE CHARACTERIZATION SYSTEMS AND METHODS FOR ERASING AND DEBUGGING PROGRAMMABLE LOGIC DEVICES

(71) Applicant: Lattice Semiconductor Corporation, Hillsboro, OR (US)

(72) Inventors: Fulong Zhang, Cupertino, CA (US); Srirama Chandra, Portland, OR (US); Sreepada Hegade, San Jose, CA (US); Joel Coplen, Portland, OR (US); Wei Han, Portland, OR (US); Yu Sun, Shanghai (CN)

(73) Assignee: Lattice Semiconductor Corporation, Hillsboro, OR (US)

(*) Notice: Subject to any disclaimer, the term of this patent is extended or adjusted under 35 U.S.C. 154(b) by 352 days.

(21) Appl. No.: 17/093,578

(22) Filed: Nov. 9, 2020

(65) Prior Publication Data

US 2021/0081578 A1  Mar. 18, 2021

Related U.S. Application Data

(63) Continuation of application No. PCT/US2019/031881, filed on May 10, 2019.
(Continued)

(51) Int. Cl.
*G06F 21/57* (2013.01)
*G06F 8/65* (2018.01)
(Continued)

(52) U.S. Cl.
CPC ............. *G06F 21/575* (2013.01); *G06F 8/65* (2013.01); *G06F 9/44505* (2013.01);
(Continued)

(58) Field of Classification Search
CPC ...... G06F 21/575; G06F 8/65; G06F 9/44505; G06F 11/3656; G06F 12/0246;
(Continued)

(56) References Cited

U.S. PATENT DOCUMENTS

| 5,425,036 | A | 6/1995 | Liu et al. |
|---|---|---|---|
| 5,838,901 | A | 11/1998 | Curd et al. |

(Continued)

FOREIGN PATENT DOCUMENTS

| EP | 1124330 | 8/2001 |
|---|---|---|
| EP | 2056231 | 5/2009 |

(Continued)

*Primary Examiner* — Bryan F Wright
(74) *Attorney, Agent, or Firm* — Haynes and Boone, LLP

(57) ABSTRACT

Systems and methods for failure characterization of secure programmable logic devices (PLDs) are disclosed. An example system includes a secure PLD including programmable logic blocks (PLBs) arranged in PLD fabric of the secure PLD, and a configuration engine configured to program the PLD fabric according to a configuration image stored in non-volatile memory (NVM) of the secure PLD and/or coupled through a configuration input/output (I/O) of the secure PLD. The secure PLD is configured to receive a failure characterization (FC) command from the PLD fabric or an external system coupled to the secure PLD through the configuration I/O, and to execute the FC command to, at least in part, erase and/or nullify portions of the NVM. The secure PLD may also be configured to boot a debug configuration for the PLD fabric that identifies and/or characterizes operational failures of the secure PLD.

20 Claims, 10 Drawing Sheets

Related U.S. Application Data

(60) Provisional application No. 62/846,365, filed on May 10, 2019, provisional application No. 62/756,021, filed on Nov. 5, 2018, provisional application No. 62/756,001, filed on Nov. 5, 2018, provisional application No. 62/756,015, filed on Nov. 5, 2018, provisional application No. 62/670,487, filed on May 11, 2018.

(51) Int. Cl.
| | |
|---|---|
| *G06F 9/445* | (2018.01) |
| *G06F 11/36* | (2006.01) |
| *G06F 12/02* | (2006.01) |
| *G06F 21/31* | (2013.01) |
| *G06F 21/44* | (2013.01) |
| *G06F 21/76* | (2013.01) |
| *G06F 21/79* | (2013.01) |
| *G06F 21/85* | (2013.01) |
| *H03K 19/17768* | (2020.01) |
| *H04L 9/08* | (2006.01) |
| *H04L 9/30* | (2006.01) |
| *H04L 9/32* | (2006.01) |
| *G06F 21/10* | (2013.01) |

(52) U.S. Cl.
CPC ...... *G06F 11/3656* (2013.01); *G06F 12/0246* (2013.01); *G06F 21/31* (2013.01); *G06F 21/44* (2013.01); *G06F 21/572* (2013.01); *G06F 21/577* (2013.01); *G06F 21/76* (2013.01); *G06F 21/79* (2013.01); *G06F 21/85* (2013.01); *H03K 19/17768* (2013.01); *H04L 9/0825* (2013.01); *H04L 9/085* (2013.01); *H04L 9/0877* (2013.01); *H04L 9/30* (2013.01); *H04L 9/3236* (2013.01); *H04L 9/3252* (2013.01); *G06F 21/107* (2023.08); *H04L 2209/12* (2013.01)

(58) Field of Classification Search
CPC ........ G06F 21/31; G06F 21/44; G06F 21/572; G06F 21/577; G06F 21/76; G06F 21/79; G06F 21/85; G06F 2221/0751; G06F 11/362; G06F 21/64; H03K 19/17768; H04L 9/0825; H04L 9/085; H04L 9/0877; H04L 9/30; H04L 9/3236; H04L 9/3252; H04L 2209/12
USPC ....................................................... 713/189
See application file for complete search history.

(56) References Cited

U.S. PATENT DOCUMENTS

| | | | |
|---|---|---|---|
| 5,991,880 | A | 11/1999 | Curd et al. |
| 6,357,037 | B1 | 3/2002 | Burnham et al. |
| 6,904,527 | B1 | 6/2005 | Parlour et al. |
| 6,996,713 | B1 | 2/2006 | Trimberger |
| 7,047,352 | B1 | 5/2006 | Khu et al. |
| 7,162,644 | B1 | 1/2007 | Trimberger |
| 7,197,647 | B1 | 3/2007 | Van Essen et al. |
| 7,203,842 | B2 | 4/2007 | Kean |
| 7,339,400 | B1 | 3/2008 | Walstrum, Jr. et al. |
| 7,624,432 | B2 | 11/2009 | Wood |
| 7,716,497 | B1 | 5/2010 | Trimberger |
| 7,725,738 | B1 | 5/2010 | Langhammer et al. |
| 7,759,968 | B1 | 7/2010 | Hussein et al. |
| 7,834,652 | B1 | 11/2010 | Tang et al. |
| 7,877,461 | B1 | 1/2011 | Rimmer |
| 7,971,072 | B1 | 6/2011 | Donlin et al. |
| 8,516,268 | B2 | 8/2013 | Woodall |
| 8,621,597 | B1 * | 12/2013 | Jenkins, IV ...... H03K 19/17768 726/14 |
| 8,843,764 | B2 | 9/2014 | Hussain |
| 8,898,480 | B2 | 11/2014 | LaMacchia et al. |
| 9,165,143 | B1 | 10/2015 | Sanders et al. |
| 9,230,091 | B2 | 1/2016 | LaMacchia et al. |
| 9,230,112 | B1 | 1/2016 | Peterson et al. |
| 9,305,185 | B1 | 4/2016 | Pederson |
| 9,424,019 | B2 | 8/2016 | Nightingale et al. |
| 9,792,154 | B2 | 10/2017 | Burger et al. |
| 9,819,542 | B2 | 11/2017 | Burger |
| 9,847,980 | B2 | 12/2017 | Burger et al. |
| 9,911,010 | B2 | 3/2018 | Woodall |
| 10,216,555 | B2 | 2/2019 | Chiou et al. |
| 10,270,709 | B2 | 4/2019 | Burger et al. |
| 10,296,392 | B2 | 5/2019 | Heil et al. |
| 10,419,493 | B2 | 9/2019 | Barday |
| 2003/0046607 | A1 | 3/2003 | May et al. |
| 2005/0081118 | A1 | 4/2005 | Cheston et al. |
| 2006/0080172 | A1 | 4/2006 | Najarian et al. |
| 2006/0294103 | A1 | 12/2006 | Wood |
| 2007/0021843 | A1 | 1/2007 | Neill et al. |
| 2007/0198892 | A1 | 8/2007 | Ng et al. |
| 2007/0204170 | A1 | 8/2007 | Oren et al. |
| 2007/0282951 | A1 | 12/2007 | Slimis et al. |
| 2007/0288765 | A1 | 12/2007 | Kean |
| 2009/0060197 | A1 | 3/2009 | Taylor et al. |
| 2009/0280774 | A1 | 11/2009 | Patel et al. |
| 2009/0300758 | A1 | 12/2009 | Hauck et al. |
| 2011/0063093 | A1 | 3/2011 | Fung et al. |
| 2013/0145140 | A1 | 6/2013 | Hsien |
| 2013/0346758 | A1 | 12/2013 | LaMacchia et al. |
| 2014/0344581 | A1 | 11/2014 | Grieco et al. |
| 2015/0199520 | A1 | 7/2015 | Woolley et al. |
| 2015/0326540 | A1 | 11/2015 | Hamburg et al. |
| 2015/0326567 | A1 | 11/2015 | Hamburg et al. |
| 2016/0011878 | A1 | 1/2016 | Chandra et al. |
| 2016/0026826 | A1 | 1/2016 | Kocher et al. |
| 2016/0072629 | A1 | 3/2016 | Kulkarni |
| 2016/0125187 | A1 | 5/2016 | Oxford |
| 2016/0217021 | A1 * | 7/2016 | Wang .................. G06F 11/3079 |
| 2017/0147356 | A1 | 5/2017 | Kotary et al. |
| 2017/0222869 | A1 | 8/2017 | Guo et al. |
| 2018/0082083 | A1 | 3/2018 | Smith et al. |
| 2019/0138369 | A1 * | 5/2019 | Lambert ............. H04L 41/0645 |
| 2021/0081536 | A1 | 3/2021 | Zhang et al. |
| 2021/0081577 | A1 | 3/2021 | Zhang et al. |
| 2021/0083675 | A1 | 3/2021 | Chandra et al. |

FOREIGN PATENT DOCUMENTS

| | | |
|---|---|---|
| EP | 2341457 | 7/2011 |
| EP | 19799077.3 | 12/2020 |
| EP | 19799852.9 | 12/2020 |
| EP | 19799989.9 | 12/2020 |
| EP | 19800359.2 | 12/2020 |
| JP | 2015-507234 | 12/2014 |
| WO | WO200049717 | 8/2000 |
| WO | WO2003023616 A2 | 3/2003 |
| WO | WO2017161305 | 9/2017 |
| WO | PCT/US2019/031875 | 5/2019 |
| WO | PCT/US2019/031881 | 5/2019 |
| WO | PCT/US2019/031883 | 5/2019 |
| WO | PCT/US2019/031886 | 5/2019 |

* cited by examiner

FAILURE CHARACTERIZATION SYSTEMS AND METHODS FOR ERASING AND DEBUGGING PROGRAMMABLE LOGIC DEVICES

CROSS REFERENCE TO RELATED APPLICATIONS

This application is a continuation of International Patent Application No. PCT/US2019/031881 filed May 10, 2019 and entitled "FAILURE CHARACTERIZATION SYSTEMS AND METHODS FOR PROGRAMMABLE LOGIC DEVICES," which is incorporated herein by reference in its entirety.

International Patent Application No. PCT/US2019/031881 filed May 10, 2019 claims priority to and the benefit of U.S. Provisional Patent Application No. 62/846,365 filed May 10, 2019 and entitled "SECURE BOOT SYSTEMS AND METHODS FOR PROGRAMMABLE LOGIC DEVICES," which is hereby incorporated by reference in its entirety.

International Patent Application No. PCT/US2019/031881 filed May 10, 2019 claims priority to and the benefit of U.S. Provisional Patent Application No. 62/756,021 filed Nov. 5, 2018 and entitled "ASSET MANAGEMENT SYSTEMS AND METHODS FOR PROGRAMMABLE LOGIC DEVICES," which is hereby incorporated by reference in its entirety.

International Patent Application No. PCT/US2019/031881 filed May 10, 2019 claims priority to and the benefit of U.S. Provisional Patent Application No. 62/756,001 filed Nov. 5, 2018 and entitled "KEY PROVISIONING SYSTEMS AND METHODS FOR PROGRAMMABLE LOGIC DEVICES," which is hereby incorporated by reference in its entirety.

International Patent Application No. PCT/US2019/031881 filed May 10, 2019 claims priority to and the benefit of U.S. Provisional Patent Application No. 62/756,015 filed Nov. 5, 2018 and entitled "FAILURE CHARACTERIZATION SYSTEMS AND METHODS FOR PROGRAMMABLE LOGIC DEVICES," which is hereby incorporated by reference in its entirety.

International Patent Application No. PCT/US2019/031881 filed May 10, 2019 claims priority to and the benefit of U.S. Provisional Patent Application No. 62/670,487 filed May 11, 2018 and entitled "DEVICES WITH PROGRAMMABLE LOGIC AND SECURITY FEATURES AND METHODS OF USING," which is hereby incorporated by reference in its entirety.

TECHNICAL FIELD

The present invention relates generally to programmable logic devices and, more particularly, to characterizing failures in secure configuration and/or operation of such devices.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, user designs are synthesized and mapped into configurable resources (e.g., programmable logic gates, look-up tables (LUTs), embedded hardware, or other types of resources) and interconnections available in particular PLDs. Physical placement and routing for the synthesized and mapped user designs may then be determined to generate configuration data for the particular PLDs.

Customers for PLDs often dedicate considerable resources to developing configurations for their chosen PLD type and/or capability, and protecting the configuration data and protecting against subversion of a desired operation or capability tied to the chosen PLD and/or developed configuration is of paramount importance to many customers for PLDs. Thus, there is a need in the art for systems and methods to manufacture, protect, distribute, upgrade, and test PLDs and PLD configurations, particularly in the context of trusted computing applications and trusted computing architectures.

Figure 1:
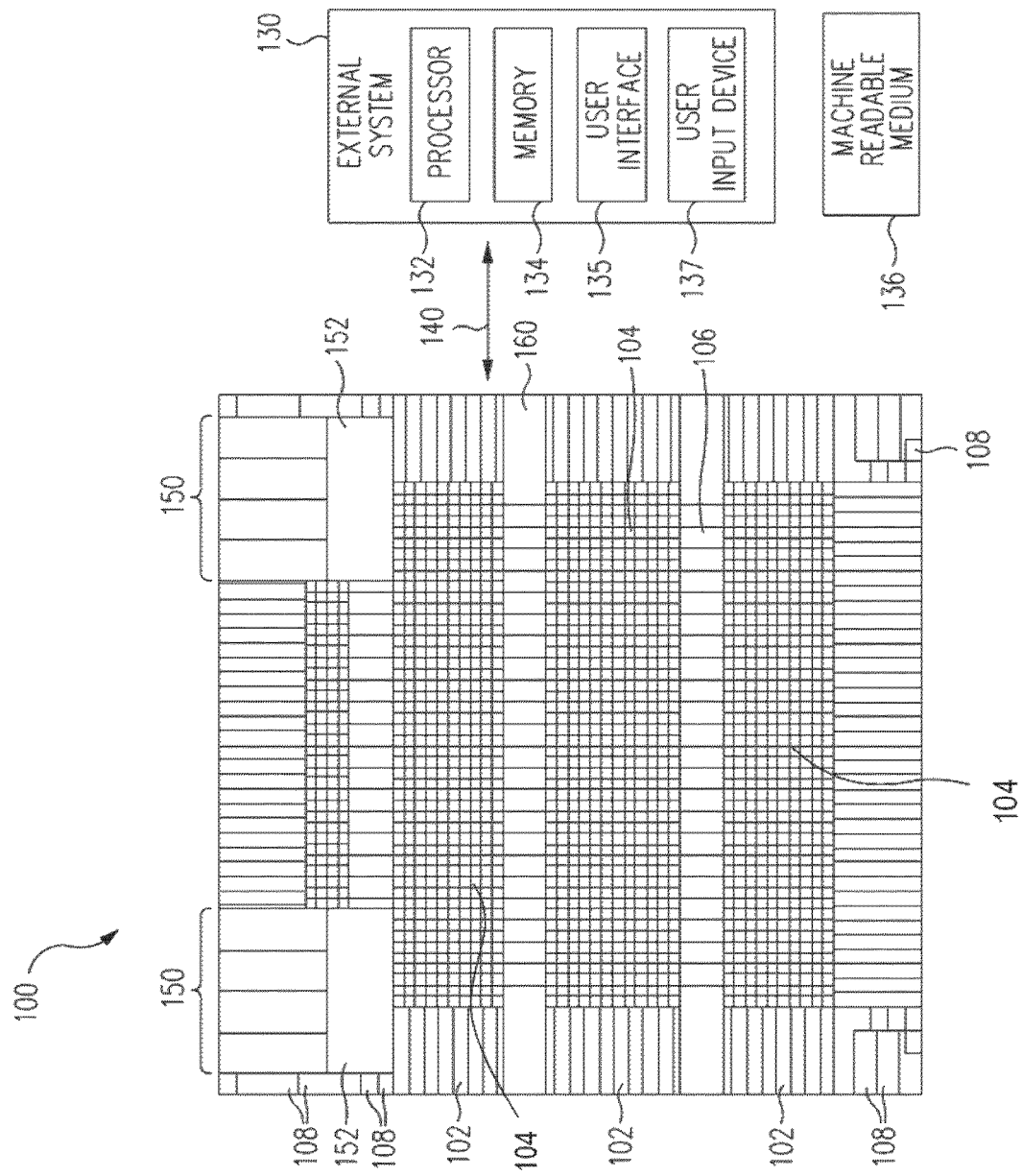
FIG. 1 illustrates a block diagram of a programmable logic device (PLD) in accordance with an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for facilitating secure return and failure characterization of a locked secure programmable logic device (PLD) for use in trusted computing applications and architectures, as described herein. For example, embodiments provide systems and methods of securely erasing a secure PLD locked to a customer defined configuration and/or operating context that is suspected of harboring a physical or other type of operational failure, so that a debugging process can be performed on or by the secure PLD and the failure can be identified, characterized, and/or repaired/mitigated without risking loss or extraction of the customer's data and, in some instances, without need to orphan or otherwise destroy or waste the secure PLD to protect the customer's data or to limit distribution of freely programmable unlocked secure PLDs (e.g., which may otherwise be programmed with non-customer data and potentially be used to subvert various security operations for a trusted platform, for example, including securely configuring and/or booting such platform/user device, as described herein.

In accordance with embodiments set forth herein, techniques are provided to securely implement user designs in programmable logic devices (PLDs). In various embodiments, a user design may be converted into and/or represented by a set of PLD components (e.g., configured for logic, arithmetic, or other hardware functions) and their associated interconnections available in a PLD. For example, a PLD may include a number of programmable logic blocks (PLBs), each PLB including a number of logic cells, and configurable routing resources that may be used to interconnect the PLBs and/or logic cells. In some embodiments, each PLB may be implemented with between 2 and 16 or between 2 and 32 logic cells.

In general, a PLD (e.g., an FPGA) fabric includes one or more routing structures and an array of similarly arranged logic cells arranged within programmable function blocks (e.g., PFBs and/or PLBs). The purpose of the routing structures is to programmably connect the ports of the logic cells/PLBs to one another in such combinations as necessary to achieve an intended functionality. A secure PLD may include various additional "hard" engines or modules configured to provide a range of security functionality that may be linked to operation of the PLD fabric to provide configurable trusted computing functionality and/or architectures. Routing flexibility and configurable function embedding may be used when synthesizing, mapping, placing, and/or routing a user design into a number of PLD components. As a result of various user design optimization processes, which can incur significant design time and cost, a user design can be implemented relatively efficiently, thereby freeing up configurable PLD components that would otherwise be occupied by additional operations and routing resources. In some embodiments, an optimized user design may be represented by a netlist that identifies various types of components provided by the PLD and their associated signals. In embodiments that produce a netlist of the converted user design, the optimization process may be performed on such a netlist. Once optimized, such configuration may be encrypted and signed and/or otherwise secured for distribution to a secured PLD, and such process may include one or more key provisioning processes, as described herein.

Referring now to the drawings, FIG. 1 illustrates a block diagram of a PLD 100 in accordance with an embodiment of the disclosure. PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). More generally, the individual elements of PLD 100 may be referred to as a PLD fabric.

I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SERDES) blocks 150 and physical coding sublayer (PCS) blocks 152. PLD 100 may also include hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, certain I/O blocks 102 may be used for programming memory 106 or transferring information (e.g., various types of user data and/or control signals) to/from PLD 100. Other I/O blocks 102 include a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, I/O blocks 102 may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources (e.g., routing resources 180 of FIG. 2) to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, system 130 may provide such configuration data to one or more I/O blocks 102, SERDES blocks 150, and/or other portions of PLD 100. As a result, programmable logic blocks 104, various routing resources, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, system 130 may run PLD configuration software, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

Figure 2:
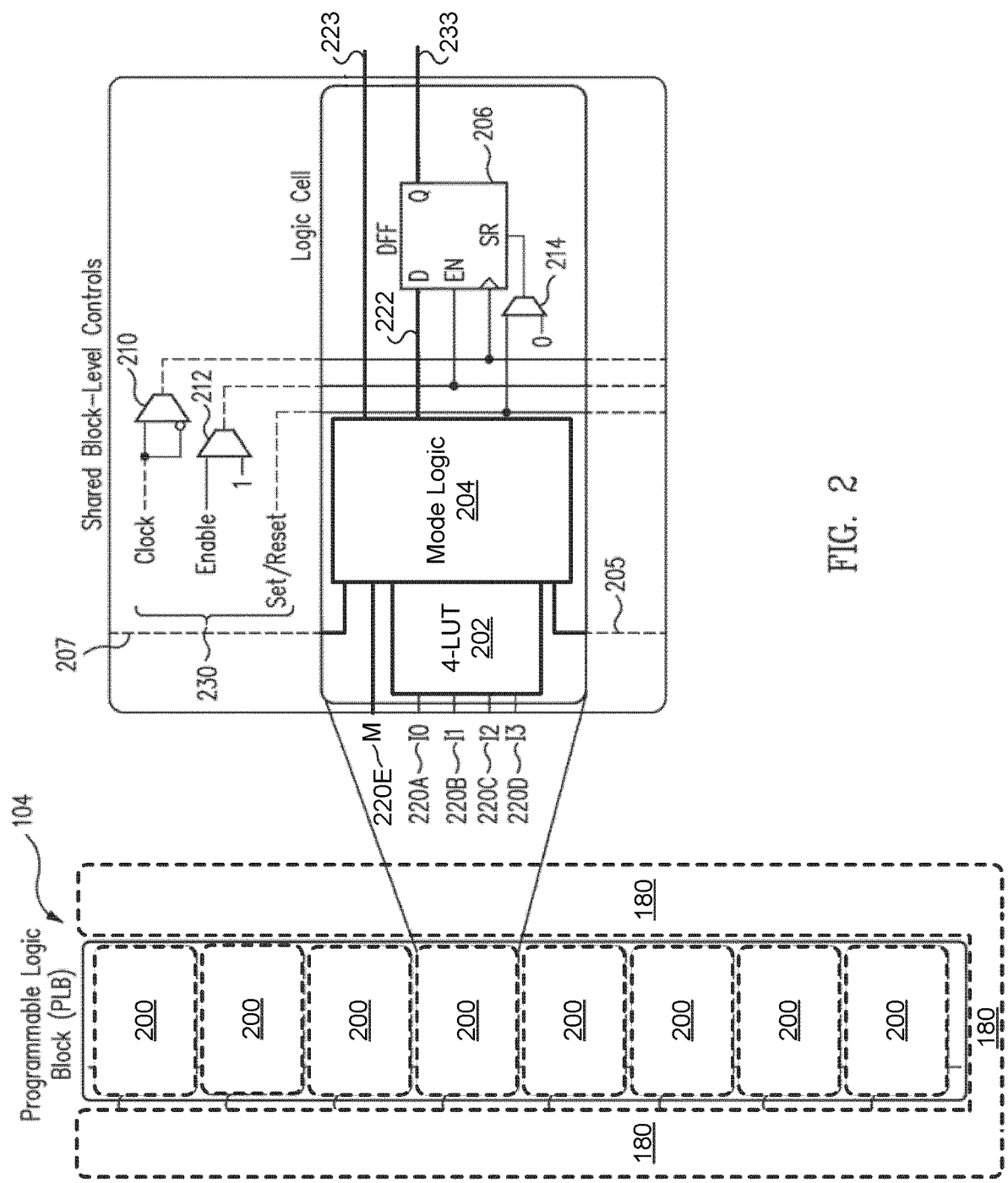
FIG. 2 illustrates a block diagram of a logic block for a PLD in accordance with an embodiment of the disclosure.

FIG. 2 illustrates a block diagram of a logic block 104 of PLD 100 in accordance with an embodiment of the disclosure. As discussed, PLD 100 includes a plurality of logic blocks 104 including various components to provide logic and arithmetic functionality. In the example embodiment shown in FIG. 2, logic block 104 includes a plurality of logic cells 200, which may be interconnected internally within logic block 104 and/or externally using routing resources 180. For example, each logic cell 200 may include various components such as: a lookup table (LUT) 202, a mode logic circuit 204, a register 206 (e.g., a flip-flop or latch), and various programmable multiplexers (e.g., programmable multiplexers 212 and 214) for selecting desired signal paths for logic cell 200 and/or between logic cells 200. In this example, LUT 202 accepts four inputs 220A-220D, which makes it a four-input LUT (which may be abbreviated as "4-LUT" or "LUT4") that can be programmed by configuration data for PLD 100 to implement any appropriate logic operation having four inputs or less. Mode Logic 204 may include various logic elements and/or additional inputs, such as input 220E, to support the functionality of various modes, as described herein. LUT 202 in other examples may be of any other suitable size having any other suitable number of inputs for a particular implementation of a PLD. In some embodiments, different size LUTs may be provided for different logic blocks 104 and/or different logic cells 200.

An output signal 222 from LUT 202 and/or mode logic 204 may in some embodiments be passed through register 206 to provide an output signal 233 of logic cell 200. In various embodiments, an output signal 223 from LUT 202 and/or mode logic 204 may be passed to output 223 directly, as shown. Depending on the configuration of multiplexers 210-214 and/or mode logic 204, output signal 222 may be temporarily stored (e.g., latched) in latch 206 according to control signals 230. In some embodiments, configuration data for PLD 100 may configure output 223 and/or 233 of logic cell 200 to be provided as one or more inputs of another logic cell 200 (e.g., in another logic block or the same logic block) in a staged or cascaded arrangement (e.g., comprising multiple levels) to configure logic operations that cannot be implemented in a single logic cell 200 (e.g., logic operations that have too many inputs to be implemented by a single LUT 202). Moreover, logic cells 200 may be implemented with multiple outputs and/or interconnections to facilitate selectable modes of operation, as described herein.

Mode logic circuit 204 may be utilized for some configurations of PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, mode logic circuits 204, across multiple logic cells 202, may be chained together to pass carry-in signals 205 and carry-out signals 207, and/or other signals (e.g., output signals 222) between adjacent logic cells 202, as described herein. In the example of FIG. 2, carry-in signal 205 may be passed directly to mode logic circuit 204, for example, or may be passed to mode logic circuit 204 by configuring one or more programmable multiplexers, as described herein. In some embodiments, mode logic circuits 204 may be chained across multiple logic blocks 104.

Logic cell 200 illustrated in FIG. 2 is merely an example, and logic cells 200 according to different embodiments may include different combinations and arrangements of PLD components. Also, although FIG. 2 illustrates logic block 104 having eight logic cells 200, logic block 104 according to other embodiments may include fewer logic cells 200 or more logic cells 200. Each of the logic cells 200 of logic block 104 may be used to implement a portion of a user design implemented by PLD 100. In this regard, PLD 100 may include many logic blocks 104, each of which may include logic cells 200 and/or other components which are used to collectively implement the user design.

As further described herein, portions of a user design may be adjusted to occupy fewer logic cells 200, fewer logic blocks 104, and/or with less burden on routing resources 180 when PLD 100 is configured to implement the user design. Such adjustments according to various embodiments may identify certain logic, arithmetic, and/or extended logic operations, to be implemented in an arrangement occupying multiple embodiments of logic cells 200 and/or logic blocks 104. As further described herein, an optimization process may route various signal connections associated with the arithmetic/logic operations described herein, such that a logic, ripple arithmetic, or extended logic operation may be implemented into one or more logic cells 200 and/or logic blocks 104 to be associated with the preceding arithmetic/logic operations.

Figure 3:
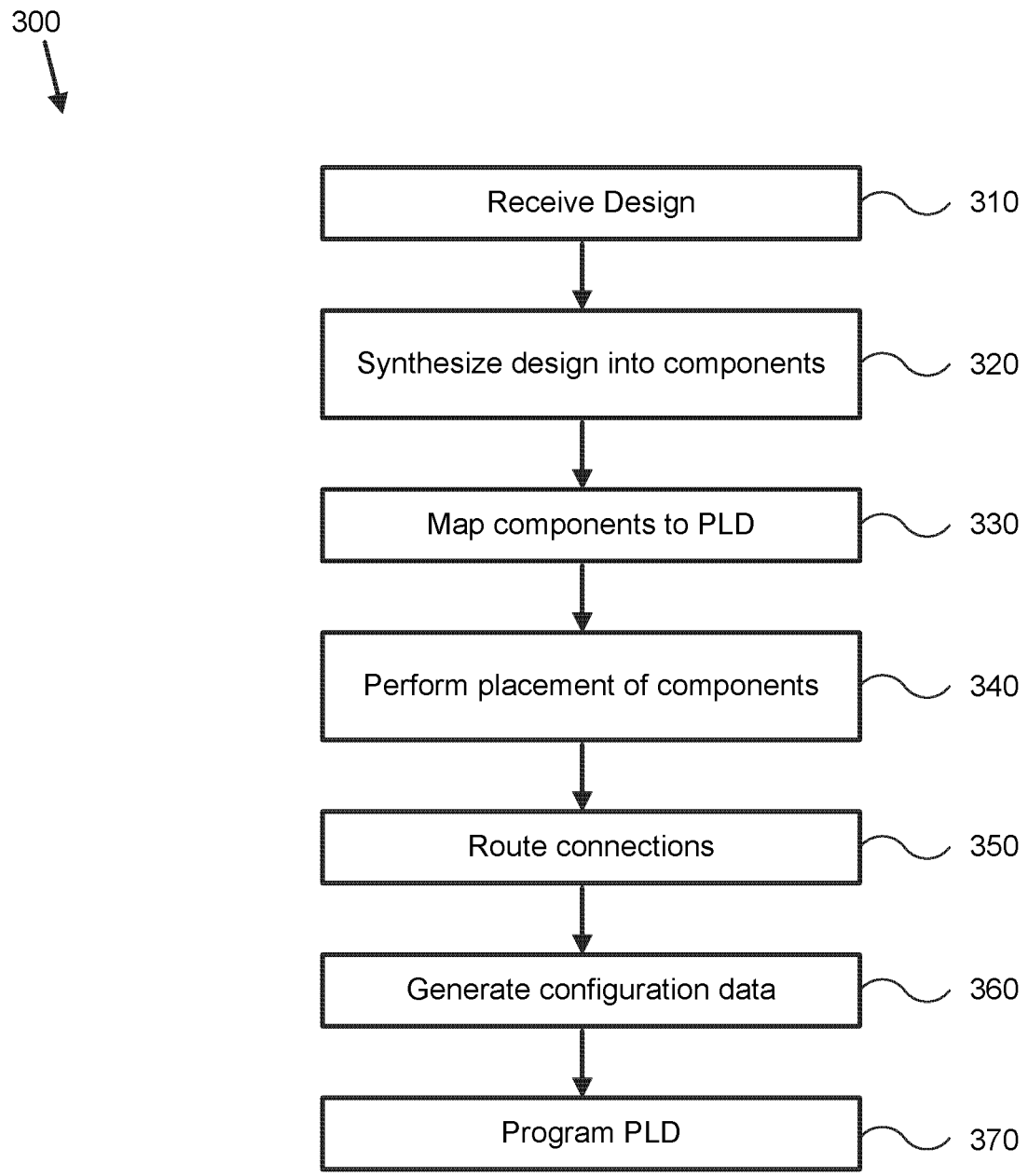
FIG. 3 illustrates a design process for a PLD in accordance with an embodiment of the disclosure.

FIG. 3 illustrates a design process 300 for a PLD in accordance with an embodiment of the disclosure. For example, the process of FIG. 3 may be performed by system 130 running Lattice Diamond software to configure PLD 100. In some embodiments, the various files and information referenced in FIG. 3 may be stored, for example, in one or more databases and/or other data structures in memory 134, machine readable medium 136, and/or otherwise. In various embodiments, such files and/or information may be encrypted or otherwise secured when stored and/or conveyed to PLD 100 and/or other devices or systems.

In operation 310, system 130 receives a user design that specifies the desired functionality of PLD 100. For example, the user may interact with system 130 (e.g., through user input device 137 and hardware description language (HDL) code representing the design) to identify various features of the user design (e.g., high level logic operations, hardware configurations, and/or other features). In some embodiments, the user design may be provided in a register transfer level (RTL) description (e.g., a gate level description). System 130 may perform one or more rule checks to confirm that the user design describes a valid configuration of PLD 100. For example, system 130 may reject invalid configurations and/or request the user to provide new design information as appropriate.

In operation 320, system 130 synthesizes the design to create a netlist (e.g., a synthesized RTL description) identifying an abstract logic implementation of the user design as a plurality of logic components (e.g., also referred to as netlist components), which may include both programmable components and hard IP components of PLD 100. In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing certain instances of a logic function operation, a ripple arithmetic operation, and/or an extended logic function operation which, when a PLD is configured to implement the user design, would occupy a plurality of configurable PLD components (e.g., logic cells 200, logic blocks 104, and/or routing resources 180). For example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to reduce the number of PLD components and/or routing resources used to implement the operations and/or to reduce the propagation delay associated with the operations, and/or reprogramming corresponding LUTs and/or mode logic to account for the interchanged operational modes.

In another example, the optimization process may include detecting extended logic function operations and/or corresponding routing resources in the user design, implementing the extended logic operations into multiple mode or convertible logic cells with single physical logic cell outputs, routing or coupling the logic cell outputs of a first set of logic cells to the inputs of a second set of logic cells to reduce the number of PLD components used to implement the extended logic operations and/or routing resources and/or to reduce the propagation delay associated with the extended logic operations, and/or programming corresponding LUTs and/or mode logic to implement the extended logic function operations with at least the first and second sets of logic cells.

In another example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to provide a programmable register along a signal path within the PLD to reduce propagation delay associated with the signal path, and reprogramming corresponding LUTs, mode logic, and/or other logic cell control bits/registers to account for the interchanged operational modes and/or to program the programmable register to store or latch a signal on the signal path.

In operation 330, system 130 performs a mapping process that identifies components of PLD 100 that may be used to implement the user design. In this regard, system 130 may map the optimized netlist (e.g., stored in operation 320 as a result of the optimization process) to various types of components provided by PLD 100 (e.g., logic blocks 104, logic cells 200, embedded hardware, and/or other portions of PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, system 130 performs a placement process to assign the mapped netlist components to particular physical components residing at specific physical locations of the PLD 100 (e.g., assigned to particular logic cells 200, logic blocks 104, routing resources 180, and/or other physical components of PLD 100), and thus determine a layout for the PLD 100. In some embodiments, the placement may be performed on one or more previously-stored NCD files, with the placement results stored as another physical design file.

In operation 350, system 130 performs a routing process to route connections (e.g., using routing resources 180) among the components of PLD 100 based on the placement layout determined in operation 340 to realize the physical interconnections among the placed components. In some embodiments, the routing may be performed on one or more previously-stored NCD files, with the routing results stored as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

In some embodiments, the optimization process may include optimizing certain instances of a logic function operation, a ripple arithmetic operation, and/or an extended logic function operation which, when a PLD is configured to implement the user design, would occupy a plurality of configurable PLD components (e.g., logic cells 200, logic blocks 104, and/or routing resources 180). For example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to reduce the number of PLD components and/or routing resources used to implement the operations and/or to reduce the propagation delay associated with the operations, and/or reprogramming corresponding LUTs and/or mode logic to account for the interchanged operational modes.

In another example, the optimization process may include detecting extended logic function operations and/or corresponding routing resources in the user design, implementing the extended logic operations into multiple mode or convertible logic cells with single physical logic cell outputs, routing or coupling the logic cell outputs of a first set of logic cells to the inputs of a second set of logic cells to reduce the number of PLD components used to implement the extended logic operations and/or routing resources and/or to reduce the propagation delay associated with the extended logic operations, and/or programming corresponding LUTs and/or mode logic to implement the extended logic function operations with at least the first and second sets of logic cells.

In another example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to provide a programmable register along a signal path within the PLD to reduce propagation delay associated with the signal path, and reprogramming corresponding LUTs, mode logic, and/or other logic cell control bits/registers to account for the interchanged operational modes and/or to program the programmable register to store or latch a signal on the signal path.

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for PLD 100 (e.g., by combining the results of the corresponding previous operations). In operation 360, system 130 generates configuration data for the synthesized, mapped, placed, and routed user design. In various embodiments, such configuration data may be encrypted and/or otherwise secured as part of such generation process, as described more fully herein. In operation 370, system 130 configures PLD 100 with the configuration data by, for example, loading a configuration data bitstream (e.g., a "configuration") into PLD 100 over connection 140. Such configuration may be provided in an encrypted, signed, or unsecured/unauthenticated form, for example, and PLD 100 may be configured to treat secured and unsecured configurations differently, as described herein.

Figure 4:
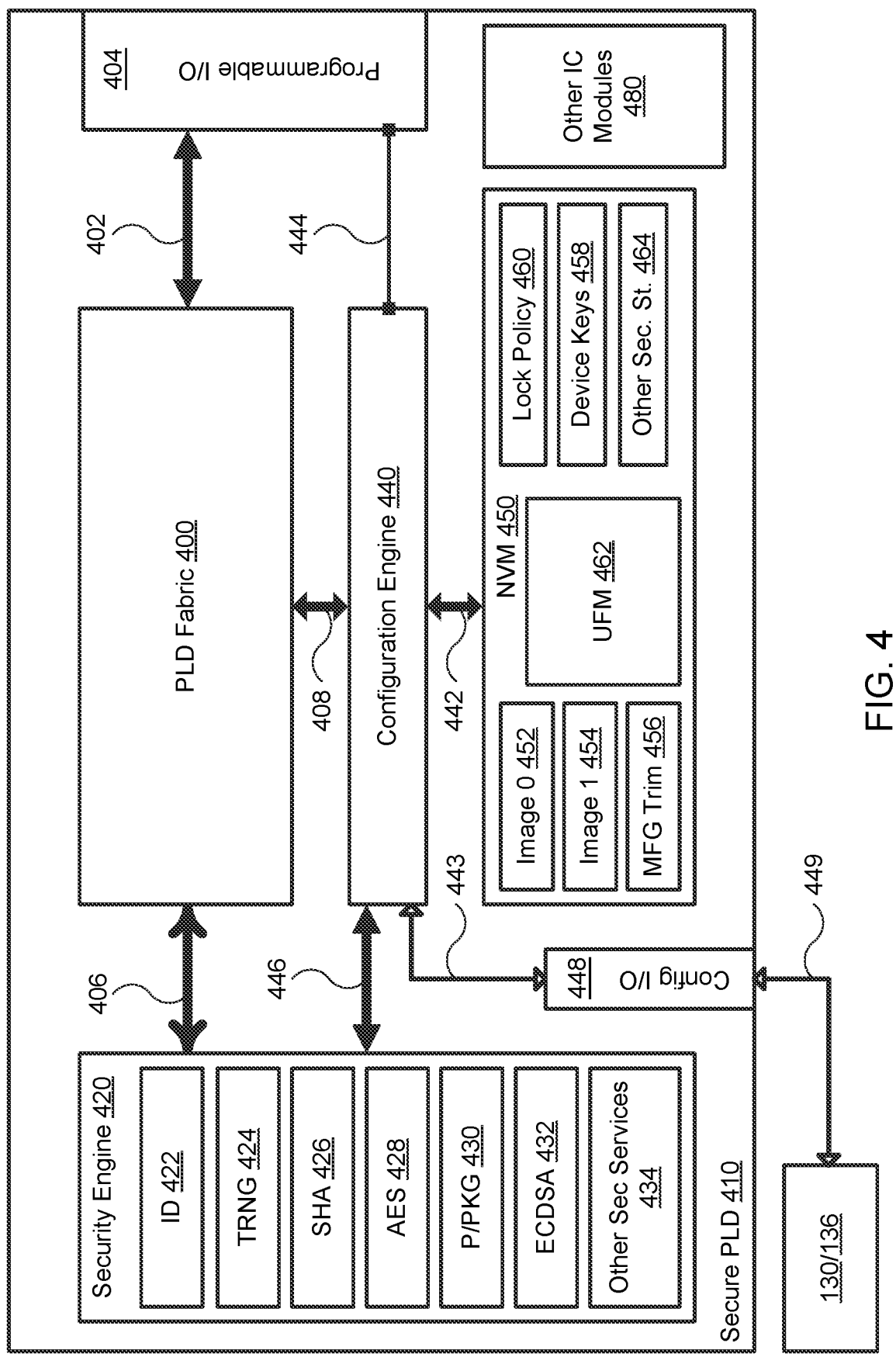
FIG. 4 illustrates a block diagram of a secure PLD in accordance with an embodiment of the disclosure.

FIG. 4 illustrates a block diagram of a secure PLD 410 in accordance with an embodiment of the disclosure. In various embodiments, secure PLD 410 may be implemented by elements similar to those described with respect to PLD 100 in FIG. 1, but with additional configurable and/or hard IP elements configured to facilitate operation of secure PLD 410 in a trusted computing application and/or architecture, as described herein. In particular, secure PLD 410 may include a PLD fabric 400 linked by various buses to a security engine 420, a configuration engine 440, a non-volatile memory (NVM) 450, a programmable I/O 404, and/or other integrated circuit (IC) modules 480, all implemented on a monolithic IC, as shown. In general, PLD fabric 400 may be implemented by any of the various elements described with respect to PLD 100 and may be configured using a design process similar to process 300 described in relation to FIG. 3 to generate and program PLD fabric 400 according to a desired configuration. More specifically, secure PLD 400 may be configured to use various identified hard IP elements identified in FIG. 4 to receive, decrypt, authenticate, and/or verify a received configuration prior to programming PLD fabric 400 according to the received configuration.

Security engine 420 may be implemented as a hard IP resource configured to provide various security functions for use by PLD fabric 400 and/or configuration engine 440. In the embodiment shown in FIG. 4, security engine 420 includes a device ID 422 (e.g., a 64-bit unique and device specific ID), a true random number generator 424, a secure hash algorithm (SHA) service 426 (e.g., an SHA256, SHA-2, and/or SHA-3 service), an advanced encryption standard (AES) service 428 (e.g., an AES128/256 encrypt/decrypt service), a public/private key pair generator (P/PKG) 430, an elliptic curve digital signature algorithm (ECDSA) authentication service 432 (e.g., an ECDSA256 service), and/or other security services 434. As also shown in FIG. 4, security engine 420 may be communicatively linked to PLD fabric 400 over limited bus 406 and to configuration engine 440 over secure bus 446. In general, limited bus 406 may be configured to allow PLD fabric 400 to access a limited set of security functions hosted by security engine 420 and/or to access such security functions in a limited manner, such as disallowing configuration of any one or all the security functions hosted by security engine 420, disallowing access to device ID 422, and/or disallowing access to a private key of a public/private key pair generated by P/PKG 430. By contrast, secure bus 446 may be configured to allow configuration engine 440 to access and/or modify all security functions, data, and/or configurations of security engine 420. In general, either or both limited bus 406 and secure bus 446 may be configured to provide encrypted and/or otherwise secured communication between security engine 420 and other elements of secure PLD 410.

Configuration engine 440 may be implemented as a hard IP resource configured to manage the configurations of and/or communications amongst the various elements of secure PLD 410. For example, configuration engine 440 may be configured to receive an encrypted/secured configuration of PLD fabric 400 from external system 130/machine readable medium 136 over configuration I/O 448, use security functions of security engine 420 to authenticate and/or decrypt such configuration, store the authenticated and/or decrypted configuration in NVM 450, soft or hard lock the portions of NVM 450 corresponding to the stored configuration, tag the stored configuration as authenticated and/or verified bootable, and/or program PLD fabric 400 according to the authenticated, decrypted, verified, and/or locked configuration, as described herein. In further embodiments, configuration engine 440 may be configured to configure at least a portion of programmable I/O 404 (e.g., to enable and/or disable at least portions of programmable I/O 404) over configuration port 444, as shown.

More generally, configuration engine 440 may be configured to manage or control configurations of elements of secure PLD 410, lock statuses of elements of secure PLD 410, boot of PLD fabric 400, and flow control throughout secure PLD 410. For example, configuration engine 440 may be configured to soft lock or unlock or hard lock any one or portion of buses 408, 442, 443, 446, for example, and/or to soft lock or unlock or hard lock any portion or sector of NVM 450. In a default unlocked configuration, buses 408, 442, and 446 may be implemented as secure buses similar in function to secure bus 446. External access bus 443 to configuration I/O 448 may be implemented according to one or more of a JTAG, I2C, SPI, and/or other external access bus or protocol, for example, configured to provide lockable/unlockable access to and/or from external system 130/machine readable medium 136. In a particular embodiment, secure bus 408 may be implemented according to a wishbone bus/interface.

NVM 450 may be implemented as a hard IP resource configured to provide securable non-volatile storage of data used to facilitate secure operation of secure PLD 410. For example, NVM 450 may include lock policy 460 corresponding to memory locations in NVM 460 indicating a lock status of data stored in NVM 450. The contents of lock policy 460 may be transferred to shadow registers within configuration engine 440 upon power on of secure PLD 410, for example, to allow such contents to be modified dynamically by configuration engine 440 and/or PLD fabric 400, depending on settings/lock statuses in lock policy 460. In general, the lock status of a particular resource indicates read, write/program, and/or erase access for that resource, as against PLD fabric 400, configuration I/O 448/external access bus 443, and/or other elements of secure PLD 410.

As described herein, "soft" lock refers to a read, write, and/or erase access status of a bus/port or memory location in NVM 450 that can be programmatically enabled or disabled by PLD fabric 400 and/or across external access bus 443 to granularly allow or disallow read, write, and/or erase access to the corresponding resource. "Hard" lock refers to a read, write, and/or erase access status of a bus/port or memory location in NVM 450 that can be programmatically enabled across external access bus 443, but that cannot be enabled or disabled by PLD fabric 400 and that cannot be disabled across external access bus 443. In various embodiments, assertion of a hard lock is generally one-way and eliminates the ability of PLD fabric 400 and/or external access bus 443 to further modify the lock status of all secured resources within secure PLD 410. In some embodiments, such locking scheme may be implemented by four bits for each resource (e.g., bus port or sector of memory within NVM 450), one bit each for hard lock enable, read lock enable, write lock enable, and erase lock enable.

As shown in the embodiment illustrated by FIG. 4, NVM 450 may include multiple differentiated lockable sectors, each of which may have its own lock status. Such lockable sectors may include, for example, one or more of a first configuration image sector 452, a second configuration image sector 454, a manufacturer-specified trim sector 456, a device key sector 458 (e.g., an AES key sector and a separate public key/key pair sector), a lock policy sector 460, a user flash memory (UFM) sector 462, and/or other defined securable storage sectors 464, as shown. In some embodiments, UFM sector 462 may be further differentiated into subsectors each of which may have its own lock status. Lock policy sector 460 may store the lock status of each sector of NVM 450, for example, including its own lock status. First and second configuration image sectors 452-454 may each store a configuration for PLD fabric 400, for example, and may further be tagged by version and/or date and as pre-authenticated so as to allow them to be selected (e.g., based on version or date) and used to program PLD fabric without performing an authentication process. Trim sector 456 may be used to store manufacturer trim and/or other data specific to a particular secure PLD 410, for example, such as a modifiable customer-specific ordering part number derived from device ID 422 and a generated customer ID number, as described herein. Device key sectors 458 may be used to store encryption/decryption keys, public/private keys, and/or other security keys specific to a particular secure PLD 410. Lock policy sector 460 may be configured to store lock statuses for resources of NVM 450, configuration engine 440, configuration I/O 448, and/or other elements of secure PLD 410. UFM sector 462 may be used to store user data generally accessible by PLD fabric 400, such as configurations or application-specific security keys, certificates, and/or other secure(d) user data. Other securable storage sectors 464 may be used to store other device specific secure(d) data. Any one or more individual elements, portions, or sectors of NVM 450 may be implemented as configurable memory, for example, or one time programmable (OTP) memory, as described herein.

Programmable I/O 404 may be implemented as at least partially configurable resources configured to provide or support a communication link between PLD fabric 400 and an external controller, memory, and/or other device, for example, across bus 402 (e.g., a bus configured to link portions of PLD fabric 400 to programmable I/O 404. In some embodiments, bus 402 and/or programmable I/O 404 may be integrated with PLD fabric 400. Configuration I/O 448 may be implemented as hard IP resources configured to support one or more external bus interfaces and/or protocols 449 to support communications with external system 130/ machine readable medium 136, as described herein. In some embodiments, configuration I/O 448 and/or bus 443 may be integrated with configuration engine 440. More generally, one or more elements of secure PLD 410 shown as separate in FIG. 4 may be integrated with and/or within each other. Other IC modules 480 may be implemented as hard and/or configurable IP resources configured to facilitate operation of secure PLD 410.

Figure 5A:
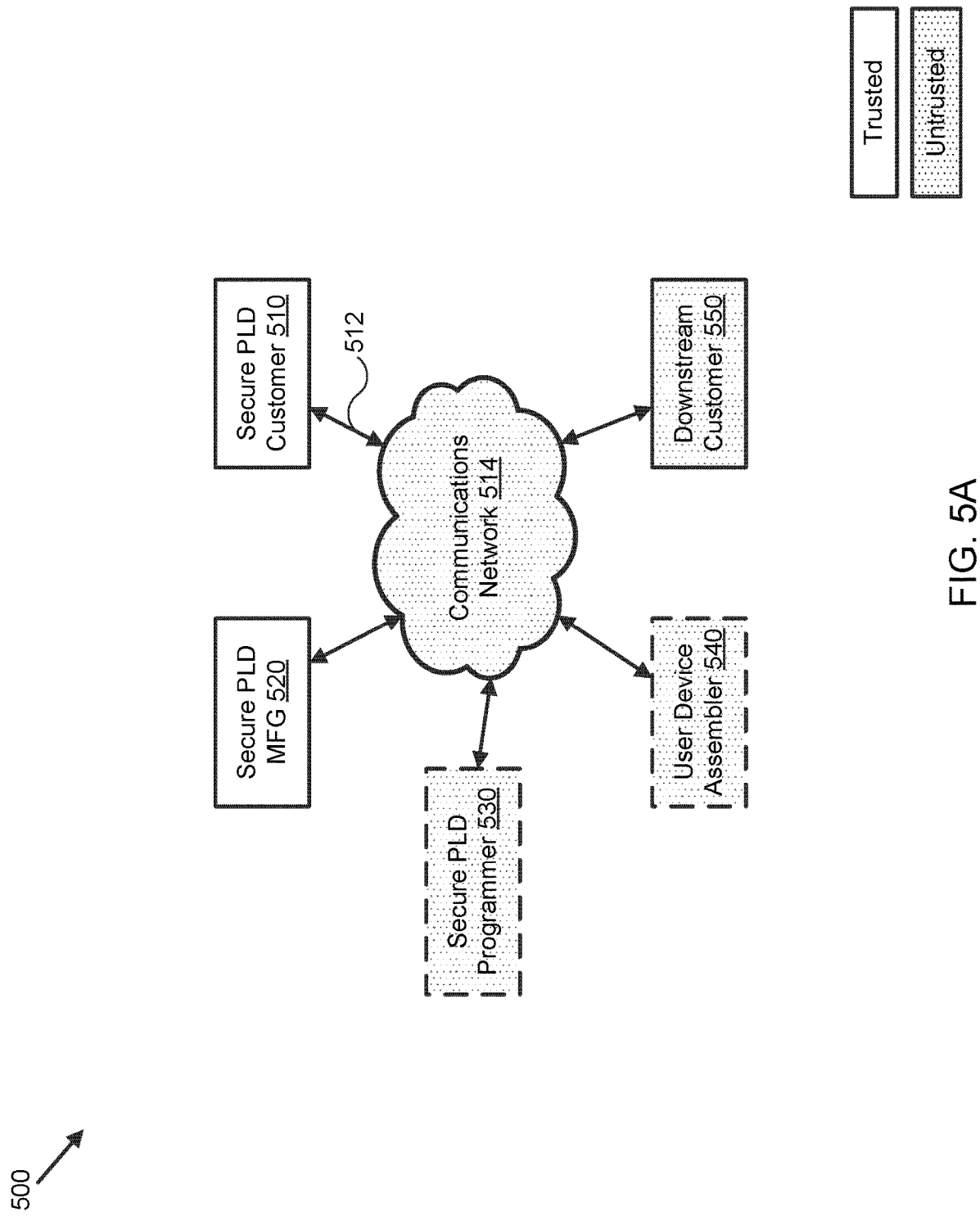
FIG. 5A illustrates a block diagram of a secure PLD provisioning system in accordance with an embodiment of the disclosure.

FIG. 5A illustrates a block diagram of a secure PLD provisioning system 500 in accordance with an embodiment of the disclosure. For example, one or more elements of provisioning system 500 may be configured to perform at least portions of the provisioning process described in relation to FIG. 7. In the embodiment shown in FIG. 5A, secure PLD provisioning system 500 includes secure PLD customer 510 and secure PLD manufacturer 520 configured to communicate with each other over communication links 512 and communications network 514. In general, communication links 512 may be implemented by one or more wired and/or wireless communication links configured to support data communications to and from communications network 514, and communications network 514 may be implemented by one or more local and/or wide area networks configured to support data communications generally (e.g., internet service providers, cellular networks, and/or the Internet). Each of the remaining elements of secure PLD provisioning system 500 represent entities in the manufacturing and delivery chain for secure PLD 410, for example, and may generally be implemented by network communication devices each similar in scope to external system 130 of FIG. 1 and configured to communicate across communication links 512 and communications network 514. In various embodiments, secure PLD provisioning system 500 may be configured to provision keys and/or other secure communication elements and/or mechanisms for secure PLDs similar to secure PLD 410.

As shown in FIG. 5A, secure PLD customer 510 and secure PLD manufacturer 520 may be considered trusted entities within provisioning system 500, and all other elements of provisioning system 500 may be considered untrusted entities, such that customer and/or manufacturer software and/or hardware should generally be protected or otherwise secured against unwanted access or manipulation by downstream customer 550 and/or optional secure PLD programmer 530 and user device assembler 540. For example, in general operation, secure PLD customer 510 requests one or more secure PLDs 410 from secure PLD manufacturer 520 and generates a proprietary configuration to be programmed into PLD fabric 400 of secure PLD 410. Secure PLD manufacturer 520 prepares the one or more requested secure PLDs 410 by fabricating the individual ICs and programming them with security mechanisms (e.g., locking them) to bar further programming by configurations not supplied by secure PLD customer 510 and/or secure PLD manufacturer 520. Secure PLD customer 510 may provide device specific encrypted configurations to optional secure PLD programmer 530, and secure PLD manufacturer 520 may provide the locked secure PLDs 410 to secure PLD programmer 530, such that secure PLD programmer 530 can only program each locked secure PLD 410 with its device-specific encrypted configuration, and such that secure PLD programmer 530 cannot easily determine the unencrypted contents of the device-specific encrypted configuration.

Secure PLD programmer 530 may deliver the programmed and locked secure PLDs 410 to optional user device assembler 540 (e.g., a motherboard assembler, a smart phone assembler, and/or other user device/embedded device assembler/manufacturer), which integrates the programmed and locked secure PLDs 410 with the user device and provides the integrated user device to downstream customer 550, all without secure PLD programmer 530 and downstream customer 550 being able to determine the unencrypted contents of the device-specific encrypted configurations or to reprogram the locked secure PLDs with alternative configurations. Secure PLD customer 510 may then audit the programmed and locked secure PLDs 410 in the corresponding user devices at downstream customer 550 without divulging the unencrypted contents of the device-specific encrypted configurations or unlocking the secure PLDs 410. Although shown in FIG. 5A as separate entities, secure PLD programmer 530 and user device assembler may be combined together and/or individually integrated with secure PLD customer 510, secure PLD manufacturer 520, and/or downstream customer 550.

Figure 5B:
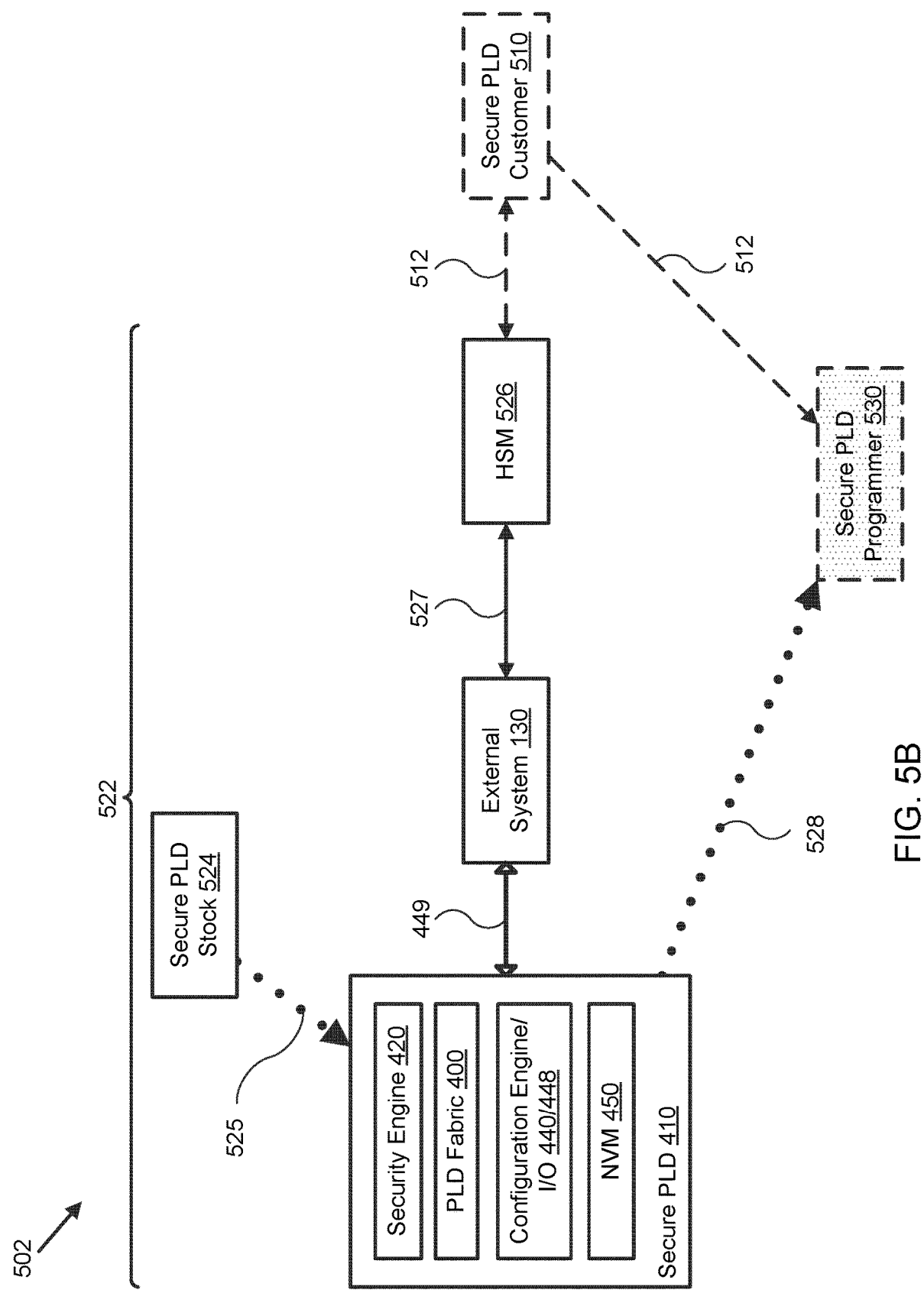
FIG. 5B illustrates a block diagram of a secure PLD provisioning system in accordance with an embodiment of the disclosure.

FIG. 5B illustrates a block diagram of a secure PLD provisioning system 502 in accordance with an embodiment of the disclosure. For example, one or more elements of provisioning system 502 may be configured to perform at least portions of the provisioning process described in relation to FIG. 7. In one embodiment, secure PLD provisioning system 502 may roughly correspond to secure PLD manufacturer 520 in FIG. 5A. More generally, a system similar to or including elements of secure PLD provisioning system 502 may be used to implement any one or multiple elements of secure PLD provisioning system 500 shown in FIG. 5A.

In the embodiment shown in FIG. 5B, secure PLD provisioning system 502 includes a secure PLD locking system 522 configured to lock and/or retarget a number of secure PLDs 410 sourced from secure PLD stock 524 (e.g., unlocked/blank secure PLDs 410 and/or previously locked secure PLDs 410 slated for retargeting to a different secure PLD customer or request) according to a request issued by secure PLD customer 510. Once locked by secure PLD locking system 522, locked secure PLDs may be programmed with a configuration provided by secure PLD customer 510, such as by locking system 522 or, more generally, by secure PLD programmer 530, as described herein. In various embodiments, secure PLD locking system 522 may include a hardened security module (HSM) 526 configured to receive a customer public key from secure PLD customer 510 over unsecured communication link 512, for example, and control external system 130 via secure communication link 527 to lock secure PLD 410 provided over device delivery link 525 (e.g., a mechanical and/or electronic delivery link configured to retrieve secure PLD 420 from PLD stock/storage area 524 and interface configuration I/O 448 of secure PLD 410 with external system 130 via external bus interface 449). Locked secure PLDs 410 may then be physically delivered to secure PLD programmer 530 over a similar device delivery link 528. HSM 526 may generally be implemented similarly to external system 130, for example, but placed in a secure factory location with monitored and limited physical access to eliminate risk of external manipulation and/or monitoring of HSM 526. In some embodiments, external system 130 and HSM 526 and/or their functionality may be integrated into a single external system 130.

In general operation, secure PLD customer 510 may provide a request for a number of locked secure PLDs 410 to HSM 526 that includes a customer public key of a customer public/private key pair (e.g., generated within secure PLD customer 510, such as by its own HSM). HSM 526 may generate a customer-specific programming public/private key pair (e.g., used to encrypt, decrypt, and/or authenticate configurations for locked secure PLDs 410, such as to lock secure PLD 410 and unlock secure PLD 410 for programming) and a programming secret (e.g., a 256-bit random number word to further authenticate provided configurations) and provide the programming private key, the programming secret, and a factory public key to external system 130 for loading into and locking a blank or unlocked secure PLD 410. HSM 526 may be configured to generate the factory public/private key pair locally and/or retrieve such factory keys from memory 134, for example, and such factory keys may be factory-specific and/or customer-specific. Configuration engine 440 may receive a device-specific trace ID (e.g., which may identify a manufacturing batch, wafer, and wafer location corresponding to a fabrication process for secure PLD 410), the programming private key, the programming secret, the factory public key, and an initial programming image (IPI) configuration for PLD fabric 400, which may all be stored in one or more sectors of NVM 450 to lock secure PLD 410.

Configuration engine 440 may then store the trace ID in MFG trim 456 of NVM 450 and/or within device ID 422 of security engine 420 and generate a device unique seed by appending a random number (e.g., generated by TRNG 424) to the end of the trace ID, and such device unique seed may be stored within MFG trim 456 and/or used to seed generation of a device public/private key pair (e.g., generated by P/PKG 430 of security engine 420), which may be stored within device keys sector 458 of NVM 450. Configuration engine 440 may then provide the resulting device public key and trace ID to external system 130, which may relay the device public key and trace ID to HSM 526 to be added to a locked PLD manifest including a line item for each locked secure PLD 410 requested by secure PLD customer 510, where each line item includes the device-specific trace ID and device public key. HSM 526 may then encrypt and sign the programming secret using the customer public key and the programming private key, and the resulting encrypted programming packet may be provided to secure PLD customer 510 and accompanied by the programming public key (e.g., to help generate an encrypted and signed configuration for PLD fabric 400 of secure PLD 410). Once completed with entries for all locked secure PLDs 410 requested by secure PLD customer 510, HSM 526 may sign the locked PLD manifest using the programming private key and provide the signed locked PLD manifest to secure PLD customer 510, which can then use the locked PLD manifest, the programming secret, and the programming public key to manage programming of locked secure PLDs 410 by secure PLD programmer 530, as described herein.

In some embodiments, HSM 526 may be configured to generate a customer programming key token corresponding to a particular secure PLD customer 510 and/or the particular request for locked secure PLDs 410 received from secure PLD customer 510. Such customer programming key token may be used to reference (e.g., within a customer database stored in HSM 526) all information stored with respect to secure PLD customer 510 and/or the request for locked secure PLDs 410 received from secure PLD customer 510. Such stored information may include the programming public/private key pair, the programming secret, the factory public/private key pair, the locked PLD manifest, and/or other information or subsets of information associated with operation of secure PLD provisioning system 502 and/or 500. In embodiments where PLD stock 524 includes one or more previously locked secure PLDs 410 slated for retargeting (e.g., locking to a different secure PLD customer or different secure PLD request), HSM 526 may be configured to use a prior customer programming key token to retrieve the information used to lock the locked secure PLD, provide new information to secure PLD 410 (e.g., through external system 130) that is signed using the previous factory private key, and provide a retargeting command to secure PLD 410 (e.g., to be executed by secure PLD 410), where the retargeting command is executed by PLD fabric 400 and/or configuration engine 440 to authenticate the new information with the previous factory public key stored in NVM 450 and replace the previous information stored in NVM 450 (e.g., the device public/private key pair, the programming private key, the programming secret, the factory public key, and/or the IPI) with corresponding new or updated information.

Figure 6:
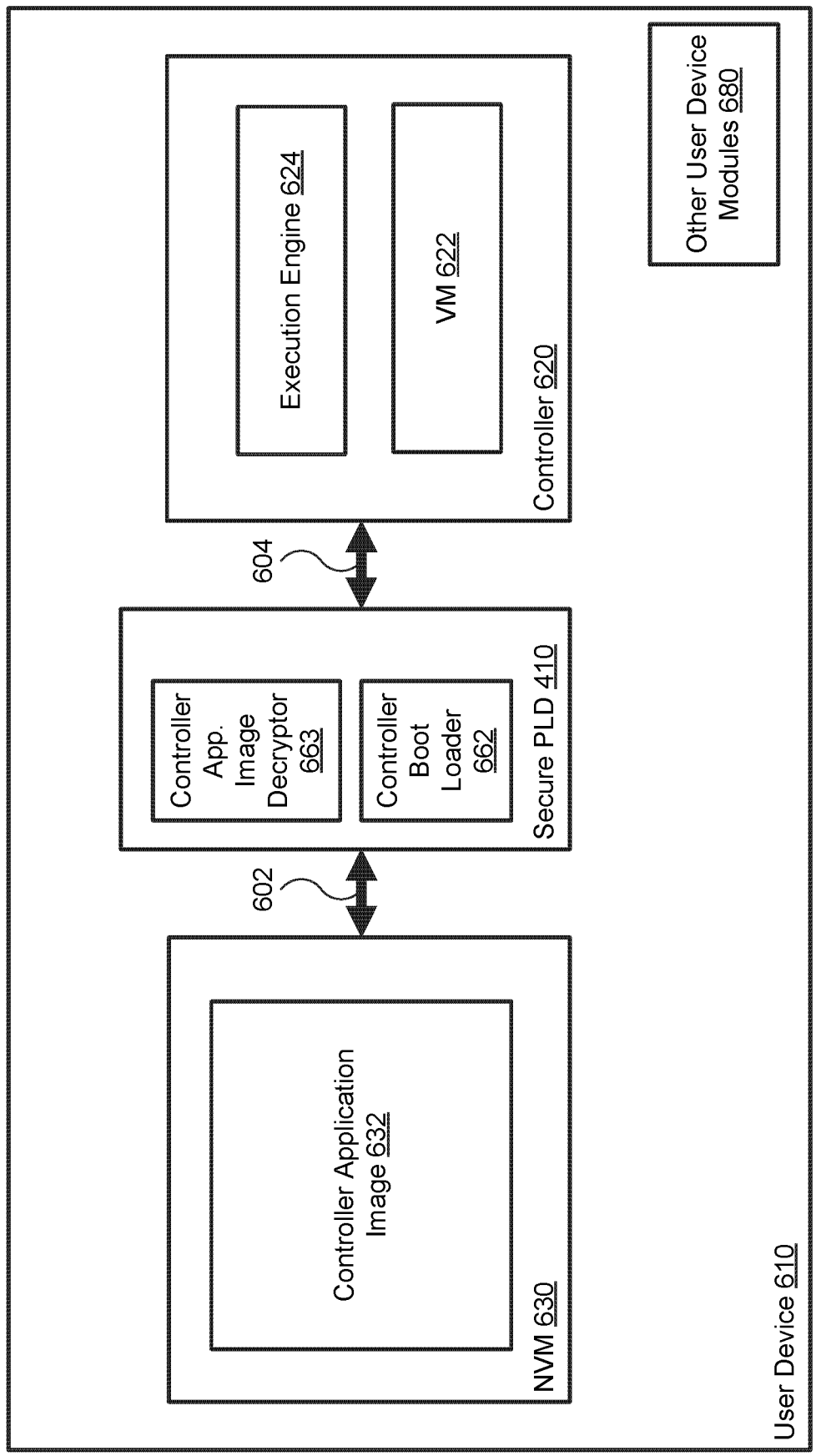
FIG. 6 illustrates a block diagram of a user device including a secure PLD in accordance with an embodiment of the disclosure.

FIG. 6 illustrates a block diagram of a user device 610 including secure PLD 410 in accordance with an embodiment of the disclosure. In one embodiment, secure PLD 410 may be configured to provide a secure boot mechanism for user device 610 (e.g., a motherboard, a smart phone, and/or other user/embedded devices). For example, at power on of user device 610, secure PLD 410 may be configured to use P/PKG 430 of security engine 420 to generate a temporary public/private key pair and to provide the temporary public key and a controller bootloader 662 (e.g., which may be pre-authenticated and/or stored in UFM 462 of NVM 450)) to controller 620 over bus 604 (e.g., a bus supported by programmable I/O 404). Execution engine 624 of controller 620 may be configured to execute controller bootloader 662 upon receiving it from secure PLD 410, which may configure execution engine 624 to generate a temporary session key (e.g., using power-on RAM values derived from a power-on state of volatile memory (VM) 612), to encrypt the temporary session key using the temporary public key provided by secure PLD 410 and a cryptographic salt, and to provide the resulting first encrypted package to secure PLD 410 over bus 604.

Secure PLD 410 may be configured to extract the temporary session key from the first encrypted package provided by controller 620 (e.g., using the temporary private key), to encrypt a controller application image decryptor 663 using the session key, and provide the resulting second encrypted package to controller 620 over bus 604. Execution engine 624 of controller 620 may be configured to extract controller application image decryptor 663 from the second encrypted package upon receiving it from secure PLD 410, which may configure execution engine 624 to retrieve, authenticate, and decrypt a controller application image 632 stored in NVM 630 (e.g., over buses 602 and 604), store the authenticated and decrypted controller application image 632 in VM 622, and execute the authenticated and decrypted controller application image 632. In addition, secure PLD 410 and controller 620 may be configured to register a secure communication path with each other.

In another embodiment, secure PLD 410 may be configured to verify a configuration used to program PLD fabric 400 of secure PLD 410, using controller 620. For example, secure PLD 410 may be configured to use P/PKG 430 of security engine 420 to generate a temporary public/private key pair and provide the temporary public key to controller 620. Execution engine 624 of controller 620 may be configured to generate a temporary session key, encrypt the temporary session key using the temporary public key provided by secure PLD 410 and a cryptographic salt, and to provide the resulting third encrypted package to secure PLD 410 over bus 604. Controller 620 may also be configured to use the session key to encrypt a request to extract identifying data from one or more configuration images stored in NVM 450 of secure PLD 410, for example, and to send the resulting fourth encrypted package to secure PLD 410 over bus 604.

Secure PLD 410 may be configured to extract the temporary session key from the third encrypted package provided by controller 620, use the temporary session key to extract the request from the fourth encrypted package, to extract the requested identifying data from the one or more configuration images stored in NVM 450 of secure PLD 410, to encrypt the requested identifying data using the temporary session key, and to provide the resulting fifth encrypted package to controller 620 over bus 604. Upon receipt, controller 620 may be configured to verify a version, release date, and/or other characteristics of the one or more configuration images stored in NVM 450 by comparison to a database of such characteristics residing in user device 610 (e.g., in NVM 630 or VM 622) and/or accessible over or retrieved from a network (e.g., communications network 514, accessed via other user device modules 680, which may include a network interface device). In further alternative embodiments, secure PLD 410 may take the place of controller 620 and be used to control operation of user device 600.

Figure 7:
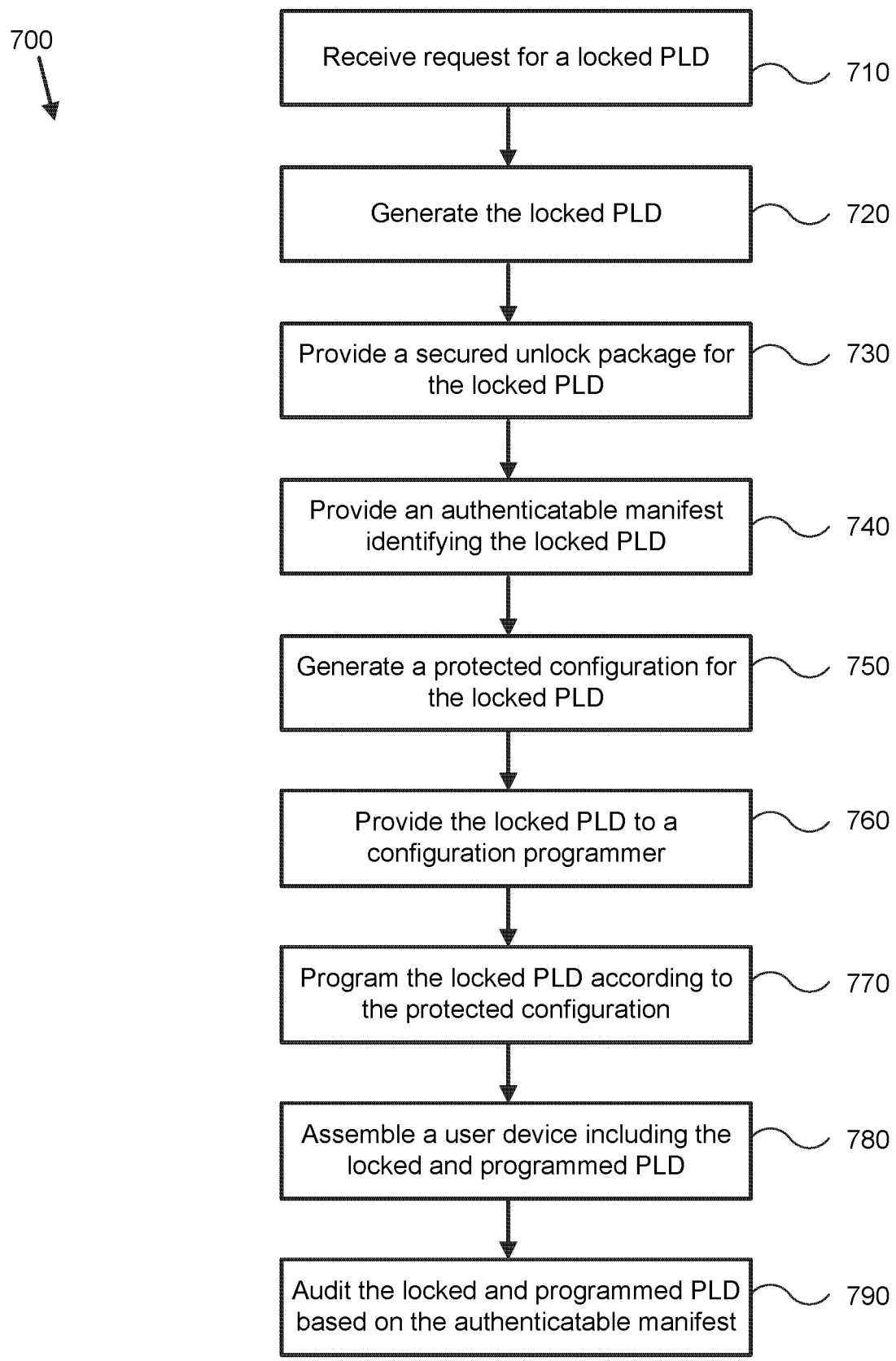
FIG. 7 illustrates a provisioning process for a locked secure PLD in accordance with an embodiment of the disclosure.

FIG. 7 illustrates a provisioning process for a locked secure PLD in accordance with an embodiment of the disclosure. In some embodiments, the operations of FIG. 7 may be implemented as software instructions executed by one or more logic devices associated with corresponding electronic devices, modules, and/or structures depicted in FIGS. 1-6. More generally, the operations of FIG. 7 may be implemented with any combination of software instructions and/or electronic hardware (e.g., inductors, capacitors, amplifiers, actuators, or other analog and/or digital components). It should be appreciated that any step, sub-step, sub-process, or block of process 700 may be performed in an order or arrangement different from the embodiments illustrated by FIG. 7. For example, in other embodiments, one or more blocks may be omitted from process 700, and other blocks may be included. Furthermore, block inputs, block outputs, various sensor signals, sensor information, calibration parameters, and/or other operational parameters may be stored to one or more memories prior to moving to a following portion of process 700. Although process 700 is described with reference to systems, devices, and elements of FIGS. 1-7, process 700 may be performed by other systems, devices, and elements, and including a different selection of electronic systems, devices, elements, assemblies, and/or arrangements. At the initiation of process 700, various system parameters may be populated by prior execution of a process similar to process 700, for example, or may be initialized to zero and/or one or more values corresponding to typical, stored, and/or learned values derived from past operation of process 700, as described herein.

In block 710, a logic device receives a request for a locked PLD. For example, a network communications device (e.g., external system 130, HSM 526) of secure PLD manufacturer 520 may be configured to receive a request for a locked secure PLD 410 from a network communications device (e.g., external system 130, HSM 526) of secure PLD customer 510. Such request may be transmitted over communication links 512 and/or through communications network 514, for example, and may include a customer public key of a corresponding customer public/private key pair, along with the number of devices requested and any specific model or other identifying information associated with a particular desired secure PLD 410.

In block 720, a logic device generates a locked PLD. For example, secure PLD manufacturer 520 may be configured to generate a locked secure PLD 410. In some embodiments, secure PLD manufacturer 520 may use an IC fabrication system to fabricate secure PLD 410, for example, which may include programming or storing or otherwise embedding device ID 422 in security engine 420 and/or MFG trim 456 of NVM 450. Secure PLD manufacturer 520 may also use external system 130 to lock secure PLD 410, as described herein. In one embodiment, secure PLD locking system 522 of secure PLD manufacturer 520 may be configured to assign a customer ID to secure PLD customer 510 and/or the request received in block 710, which may then be combined with device ID 422 and/or a device ordering part number (e.g., generated at manufacture) to provide a customer specific ordering part number that may be used to reference or identify secure PLD 410, such as in an unencrypted database stored in HSM 526.

HSM 526 may also be configured to generate a customer programming key token corresponding to secure PLD customer 510 and/or the customer public key in the request received in block 710 by generating a corresponding random and unique customer programming key token and/or a customer specific ordering part number and referencing all stored information related to generating locked secure PLDs referenced to such token or number. HSM 526 may also be configured to generate a programming public/private key pair and a programming secret, all specific to secure PLD customer 510 and/or the request received in block 710, all of which may be stored in HSM 526. HSM 526 may additionally be configured to generate a factory public/private key pair, which may be specific to secure PLD manufacturer 520, secure PLD customer 510, and/or the request received in block 710, which may also be stored in HSM 526.

HSM 526 may be configured to provide the factory public key, the programming private key, and the programming secret to external system 130 for programming/locking of secure PLD 410, for example, and to receive device-specific trace IDs and device public keys in return. HSM 526 may also be configured to encrypt and sign the programming secret using the customer public key and the programming private key, and the resulting encrypted programming packet may be provided to secure PLD customer 510 and accompanied by the programming public key (e.g., to help secure PLD customer 510 generate an encrypted and signed configuration for PLD fabric 400 of secure PLD 410). Secure PLD 410 may be configured to use TRNG 424 of security engine 420 to generate a device unique seed based on the trace ID stored in MFG trim 456 and/or device ID 422, and to use the device unique seed and/or P/PKG 430 of security engine 420 to generate a device public/private key pair, all specific to secure PLD 410, and all of which may be stored in NVM 450 (e.g., along with the programming private key, programming secret, factory public key, and/or an IPI configuration provided by external system 130 and/or HSM 526).

In another embodiment, HSM 526 may be configured to use the customer programming key token to retrieve the programming private key, the programming secret, and the device public key from a securely stored database and provide them to external system 130. External system 130 may then be configured to use the programming private key, the programming secret, and/or the device public key to provide an IPI configuration to secure PLD 410 and program PLD fabric 400 with the IPI. This programming may constitute an unsecure write operation and so may require a secure environment (e.g., taking place entirely within secure PLD manufacturer 520). In further embodiments, HSM 526 may be configured to receive a locked PLD manifest entry from external system 130 including a trace ID corresponding to secure PLD 410 and a corresponding device public key, to generate a complete locked PLD manifest corresponding to the request received in block 710, to sign the locked PLD manifest with the programming private key, and to provide the signed locked PLD manifest to secure PLD customer 510.

In additional embodiments, it may be useful to retarget an already programmed and locked secure PLD to a different customer or application (e.g., with a different programming key pair, programming secret, and public device key). Typically, an already programmed IPI need not be reprogrammed (e.g., the same IPI configuration for PLD fabric 400 may be used). For example, HSM 526 may be configured to use a customer programming key token and/or a trace ID to retrieve prior information (e.g., the original programming private key, programming secret, and device public key stored in HSM 526) used to lock secure PLD 410. HSM 526 may then be configured to use external system 130 to provide new information to secure PLD 410 that is signed using the previous factory private key, and provide a retargeting command to secure PLD 410 (e.g., to be executed by secure PLD 410), where the retargeting command may be executed by PLD fabric 400 and/or configuration engine 440 to authenticate the new information with the previous factory public key stored in NVM 450 and replace the previous information stored in NVM 450 (e.g., the device public/private key pair, the programming private key, the programming secret, the factory public key, and/or the IPI) with corresponding new or updated or retargeted information, as described herein.

In block 730, a logic device provides a secured unlock package for a locked PLD. For example, HSM 526 of secure PLD manufacturer 520 may be configured to provide a secured unlock package for the locked secure PLD 410 generated in block 720 to secure PLD customer 510. In one embodiment, HSM 526 may be configured to provide the encrypted programming packet, the programming public key, and/or the customer programming key token generated in block 720 to secure PLD customer 510. Such information may be used by secure PLD customer 510 to generate a protected configuration for secured PLD 410, as locked in block 720.

In block 740, a logic device provides an authenticatable manifest identifying a locked PLD. For example, secure PLD manufacturer 520 may be configured to provide an authenticatable locked PLD manifest identifying the locked secure PLD 410 generated in block 720. In one embodiment, HSM 526 may be configured to generate a manifest of trace IDs and device public keys (e.g., a manifest of device public keys referenced by trace ID), to sign the locked PLD manifest using the programming private key generated in block 720, and provide the signed locked PLD manifest to secure PLD customer 510. Such information may be used by secure PLD customer 510 to audit a selection of deployed and/or locked secured PLDs 410.

In block 750, a logic device generates a protected configuration for a locked PLD. For example, an external system 130 of secure PLD customer 510 may be configured to generate a protected configuration for the locked secure PLD 410 generated in block 720. In one embodiment, external system 130 may be configured to generate an unprotected configuration for PLD fabric 400 of secure PLD 410 using a process similar to process 300 discussed with reference to FIG. 3. Such configuration may include an application bitstream/configuration to be primarily loaded into and configure PLD fabric 400, for example, and a feature bitstream/configuration to be primarily loaded into and configure lock policy sector 460, UFM sector 462, and/or other defined securable storage sectors 464. Such feature bitstream/configuration may include security keys, functions, and/or other features that may be executed and/or otherwise used by configuration engine 440 to implement any of the processes described herein.

In various embodiments, external system 130 and/or an HSM 526 of secure PLD customer 510 may be configured to generate an application public/private key pair, an application encryption key (e.g., an AES encryption key), and a programming packet public/private key pair. External system 130 may be configured to sign the application and feature configurations using the application private key and to encrypt the signed application and feature configurations using the application encryption key. External system 130 may also be configured to generate a programming key digest by signing a combination/list of the application public key, the application encryption key, and the programming secret (e.g., extracted from the encrypted programming packet of the secured unlock package provided in block 730) with the application private key, deriving an encryption key based on the programming public key and the programming packet private key (e.g., using an elliptic-curve Diffie-Hellman key derivation function), encrypting the signed combination of keys using the derived encryption key, and combining the encrypted and signed combination of keys with the programming packet public key (e.g., appending the programming packet public key to the encrypted and signed combination of keys) to create the programming key digest. External system 130 may also be configured to sign a locked PLD manifest (e.g., received in block 740) with the packet private key for authenticated delivery to a downstream secure PLD programmer 530, user device assembler 540, and/or downstream customer 550. External system 130 may be configured to generate a protected configuration for secure PLD 410 by combining the encrypted application and feature configurations with the programming key digest to create a single protected packet of information.

In block 760, a logic device provides a locked PLD to a configuration programmer. For example, secure PLD manufacturer 520 may be configured to provide the locked secure PLD 410 generated in block 720 to secure PLD programmer 530, as described herein.

In block 770, a logic device programs a locked PLD according to a protected configuration. For example, an external device 130 of secure PLD programmer 530 may be configured to program the locked secure PLD 410 generated in block 720 according to the protected configuration generated in block 750 and provided by secure PLD customer 510. In one embodiment, an external system 130 of secure PLD programmer 530 may be configured to provide the protected configuration/packet generated in block 750 to secure PLD 410, which may be configured to boot according to the IPI provided to secure PLD 410 in block 720. Secure PLD 410 may then validate the protected configuration and program elements of secure PLD 410, including PLD fabric 400 and portions of NVM 450, through one or more buses of secure PLD 410. More particularly, secure PLD 410 may be configured to decrypt the encrypted keys in the programming key digest using the programming private key stored in NVM 450 in block 720 and the packet public key generated in block 750. Secure PLD 410 may also be configured to authenticate the decrypted key digest with the application public key and verify that the programming secret in the programming key digest matches the programming secret stored in NVM 450 in block 720. If both checks pass, secure PLD 410 may store the application public key and application encryption key from the key digest in NVM 450.

Once the application public key and application encryption key from the key digest are stored in NVM 450, secure PLD 410 may then decrypt the application and feature configurations and authenticate the decrypted application and feature configurations. For example, the application and feature configurations may only be programmed into secure PLD 410 if the bitstreams are successfully decrypted and authenticated using the application encryption key and the application public key. In the event the application configuration is successfully authenticated, secure PLD 410 may be configured to program/store the application configuration into one of configuration image sectors 452 or 454, to set a pre-authentication bit for the appropriate image, to erase the IPI from PLD fabric 400, and/or to program PLD fabric 400 according to the stored application configuration. The feature configuration may be programmed into one or more portions of NVM 450. Other security checks to be performed prior to programming secure PLD 410 may include validating the locked PLD manifest, checking trace ID matching within the locked PLD manifest, and/or other security checks, as described herein.

In block 780, a logic device assembles a user device including a locked and programmed PLD. For example, a pick and place system of user device assembler 540 may be configured to assemble user device 610 including the locked secure PLD 410 generated in block 720 and programmed in block 770.

In block 790, a logic device audits a locked and programmed PLD based on an authenticatable manifest. For example, secure PLD customer 510 may be configured to audit the locked secure PLD generated in block 720 and programmed in block 770 based on the authenticatable locked PLD manifest provided in block 740. In one embodiment, an external system 130 of secure PLD customer 510 or downstream customer 550 may be configured to authenticate the locked PLD manifest provided by secure PLD manufacturer 520 or secure PLD customer 510 in block 740, query secure PLD 410 for its trace ID and/or device public key and compare to the trace ID and device public key in the locked PLD manifest, and to challenge secure PLD 410 using the device public key, such as by encrypting a random number using the device public key, providing the resulting encrypted package to secure PLD 410 in a device key challenge, and comparing the returned result to the original random number (e.g., a matching result indicates a successful audit of an operating secure PLD 410). Such auditing may in some embodiments take place prior to erasing the IPI configuration in block 770. Successful auditing indicates a functioning locked secure PLD 410.

Thus, by employing the systems and methods described herein, embodiments of the present disclosure are able to provide flexible and secure key provisioning and configuration of a secure PLD across a customer order of secure PLDs. A protected configuration of one customer cannot be used to program another customer personalized secure PLD or a blank secure PLD. Protected configurations may be programmed in-system or using an external device. Application keys may be decrypted only within a secure PLD. A customer may employ a key manifest to prevent device and/or application spoofing or over building. In various embodiments, programming keys and manifests are managed by security engine 420 of secure PLD 410.

Figure 8:
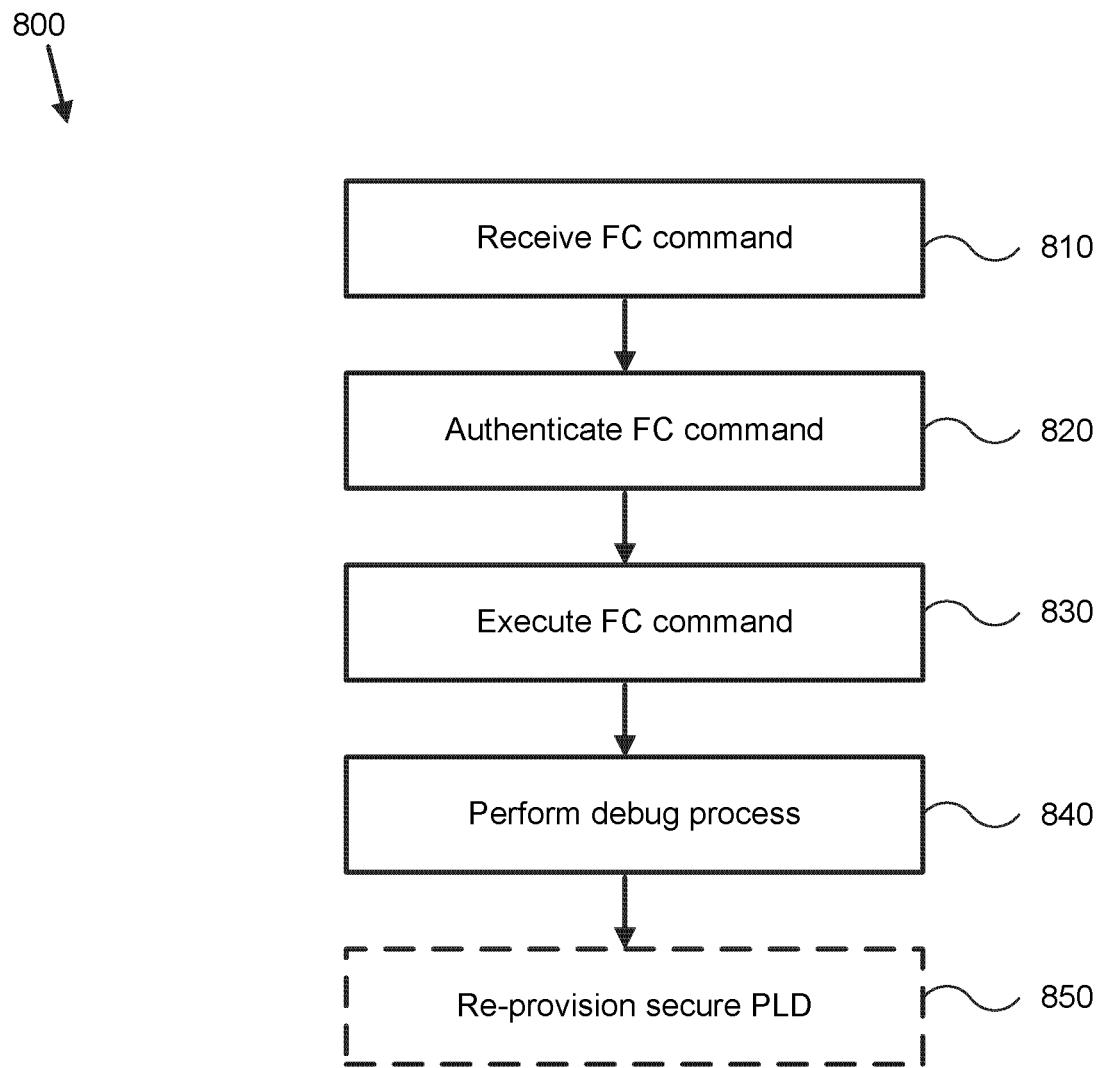
FIG. 8 illustrates a failure characterization process for a locked secure PLD in accordance with an embodiment of the disclosure.

FIG. 8 illustrates a failure characterization process 800 for a locked secure PLD 410 in accordance with an embodiment of the disclosure. In some embodiments, the operations of FIG. 8 may be implemented as software instructions executed by one or more logic devices associated with corresponding electronic devices, modules, and/or structures depicted in FIGS. 1-6. More generally, the operations of FIG. 8 may be implemented with any combination of software instructions and/or electronic hardware (e.g., inductors, capacitors, amplifiers, actuators, or other analog and/or digital components). It should be appreciated that any step, sub-step, sub-process, or block of process 800 may be performed in an order or arrangement different from the embodiments illustrated by FIG. 8. For example, in other embodiments, one or more blocks may be omitted from process 800, and other blocks may be included. Furthermore, block inputs, block outputs, various sensor signals, sensor information, calibration parameters, and/or other operational parameters may be stored to one or more memories prior to moving to a following portion of process 800. Although process 800 is described with reference to systems, devices, and elements of FIGS. 1-6, process 800 may be performed by other systems, devices, and elements, and including a different selection of electronic systems, devices, elements, assemblies, and/or arrangements. At the initiation of process 800, various system parameters may be populated by prior execution of a process similar to process 800, for example, or may be initialized to zero and/or one or more values corresponding to typical, stored, and/or learned values derived from past operation of process 800, as described herein.

In block 810, a logic device receives a failure characterization command. For example, configuration engine 440 of a locked and/or programmed secure PLD 410 may be configured to receive a failure characterization (FC) command issued by an external system 130 of secure PLD customer 510 or secure PLD manufacturer 520 coupled to secure PLD 410 over configuration I/O 448, for example, or issued by PLD fabric 400 running a customer configuration programmed into secure PLD 410 (e.g., using a process similar to that described with respect to process 700 of FIG. 7). In some embodiments, secure PLD customer 510 may issue such FC command (e.g., or provide such command to another element of secure PLD provisioning systems 500 or 502 to issue it on its behalf) after detecting a failure in operation of secure PLD 410, for example, in preparation of sending secure PLD 410 to secure PLD manufacturer 520 for failure characterization. In other embodiments, such failure characterization may take place within any element of secure PLD provisioning systems 500 or 502 and/or while secure PLD 410 is integrated with user device 610. In various embodiments, such FC command may be signed, encrypted, and/or include additional information so as to enable secure PLD 410 to authenticate the FC command. In a specific embodiment, such FC command may include the trace ID of the specific secure PLD 410 being characterized (e.g., extracted from a locked PLD manifest provided by secure PLD manufacturer 520), and an external system 130 and/or HSM 526 of secure PLD customer 510 may be configured to sign such FC command using its application private key, as described herein.

In block 820, a logic device authenticates an FC command. For example, configuration engine 440 and/or PLD fabric 400 of a locked and/or programmed secure PLD 410 may be configured to authenticate the FC command received in block 810. In one embodiment, secure PLD 410 may be configured to authenticate an FC command signed by an application private key using an application public key stored in NVM 450 during a locking, programming, or other provisioning step in a provisioning process, as described herein. In another embodiment, secure PLD 410 may be configured to authenticate such FC command by comparing an FC trace ID in the FC command with a trace ID stored in MFG trim sector 456 and/or other sector of NVM 450 or with device ID 422 of security engine 420, such that a matching trace ID in the FC commands indicates an authenticated FC command. In further embodiments, such authentication process may include decrypting the FC command using a public key stored in NVM 450, as described herein.

In block 830, a logic device executes an FC command. For example, configuration engine 440 and/or PLD fabric 400 of a locked and/or programmed secure PLD 410 may be configured to execute the FC command authenticated in block 820. In embodiments where NVM 450 includes rewritable and/or unlocked memory sectors, such FC execution may include erasing one or more sectors of NVM 450, such as one or more of image sectors 452 and 454, UFM 462, lock policy sector 460, device keys 458, and/or other securable storage sectors 464. In embodiments where NVM 450 includes OTP memory sectors, such FC execution may include nullifying one or more sectors of NVM 450, such as one or more of image sectors 452 and 454, UFM sectors 462, lock policy sector 460, device keys 458, and/or other securable storage sectors 464. Such nullifying of a sector may include setting all bits within the sector to "1" to indicate the nullified status of the sector. In general, MFG trim sector 456 may be left intact and not erased or nullified by execution of such FC command.

In various embodiments, such erasing and/or nullifying of sectors of NVM 450 may include erasing and/or nullifying less critical assets/sectors first, followed by more critical assets/sectors. For example, one such prioritized erase/nullify order might include UFM sectors 462, image sectors 452 and 454, other securable storage sectors 464 (e.g., including a stored feature bitstream/configuration including security functions and/or other features), device key sectors 458, and lock policy sectors 460. Such prioritized order may be designed to ensure secure erasure/nullification of specific customer data and/or types of data prior to unlocking potential access to such data by erasing/nullifying lock policy sectors 460 and resetting all lock statuses to an unlocked status (e.g., such that all assets/sectors/ports are accessible by PLD fabric 400 and/or over configuration I/O 448). In other embodiments, one or more sectors of NVM 450, in addition to MFG trim sector 456, may be left intact and not erased or nullified, for example, such as sectors of UFM sectors 462 and/or other securable storage sectors 464, so as to retain various security functions or features (e.g., decryption, authentication, and/or other security functions or features) in NVM 450 for use in performing a debug process or reinitializing a debugged secure PLD 410, for example.

In block 840, a logic device performs a debug process. For example, configuration engine 440 and/or PLD fabric 400 of a secure PLD 410 erased and/or nullified by execution of the authenticated FC command in block 830 may be configured to perform a debug process including receiving a debug configuration (e.g., for execution by PLD fabric 400) and/or generating a resulting debug digest to help explicitly characterize a failure of secure PLD 410, as described more fully with respect to failure characterization/debug process 840 of FIG. 9. In some embodiments, such debug process may include updating MFG trim 456, possibly iteratively, to mitigate or eliminate a cause of a failure characterized and/or otherwise identified in the generated debug digest. In further embodiments, such debug process may include an additional authentication process to help eliminate risk of an erased/nullified secure PLD being provisioned and/or used with third party configurations and/or other data that might be used to harm or invalidate operation of a user device (e.g., user device 610), for example. In various embodiments, such debug process may be configured to verify that one or more sectors of NVM 450 are erased and/or nullified prior to allowing the debug process to proceed further.

In general, blocks 830 and 840 may be performed entirely by or within secure PLD customer 510, secure PLD manufacturer 510, and/or other elements of secure PLD provisioning system 500 and/or 502. In a specific embodiment, block 830 may be performed by secure PLD customer 510 to ensure erasure of customer data prior to delivery to secure PLD manufacturer 510 for debugging according to block 840. More generally, block 830 may be performed by secure PLD customer 510, secure PLD programmer 530, user device assembler, and/or downstream customer 550 prior to delivery of secure PLD 410 and/or user device 610 to secure PLD manufacturer 520 for debugging according to block 840.

In optional block 850, a logic device re-provisions a secure PLD. For example, in embodiments where NVM 450 includes rewritable and/or unlocked memory sectors erased by execution of the FC command in block 830, configuration engine 440 of a secure PLD 410 debugged in block 840 may be configured to receive an updated MFG trim, trace ID, device keys, an IPI, and/or other data (e.g., issued/generated by an external system 130 and/or HSM 526 of secure PLD customer 510 or secure PLD manufacturer 520 coupled to secure PLD 410 over configuration I/O 448) configured to re-provision secure PLD 410 and/or place secure PLD 410 in condition to be re-provisioned using a process similar to provisioning process 700 of FIG. 7, thereby allowing a debugged secure PLD 410 to be placed back in service. In embodiments where the debug process of block 840 includes an additional authentication process prior to allowing a debug configuration or any other configuration to be loaded into and booted by PLD fabric 400, as described herein, such re-provisioning process may include authenticating an updated MFG trim, trace ID, device keys, an IPI, and/or other data prior to storing such data within NVM 450. In embodiments where NVM 450 includes OTP memory sectors nullified by execution of the FC command in block 830, the corresponding secure PLD 410 is typically unable to be re-provisioned.

Thus, by employing the systems and methods described herein, embodiments of the present disclosure are able to provide flexible and secure failure characterization of a secure PLD across a customer order of secure PLDs. A customer locked and/or otherwise provisioned secure PLD exhibiting a failure may be securely erased and provided back to the manufacturer for failure characterization and/or repair (e.g., retrim) to help the customer identify a failure mode of the secure PLD and/or an integrated user device without risking exposure of customer data. Moreover, in the event the failure mode is tracked back to a misconfiguration of the secure PLD, such as through an error in a configuration provide by the customer and not a physical failure of the secure PLD, the secure PLD may be re-provisioned according to updated customer data, for example, or according to a new customer application, without requiring the secure PLD be orphaned or otherwise destroyed by the failure characterization process.

Figure 9:
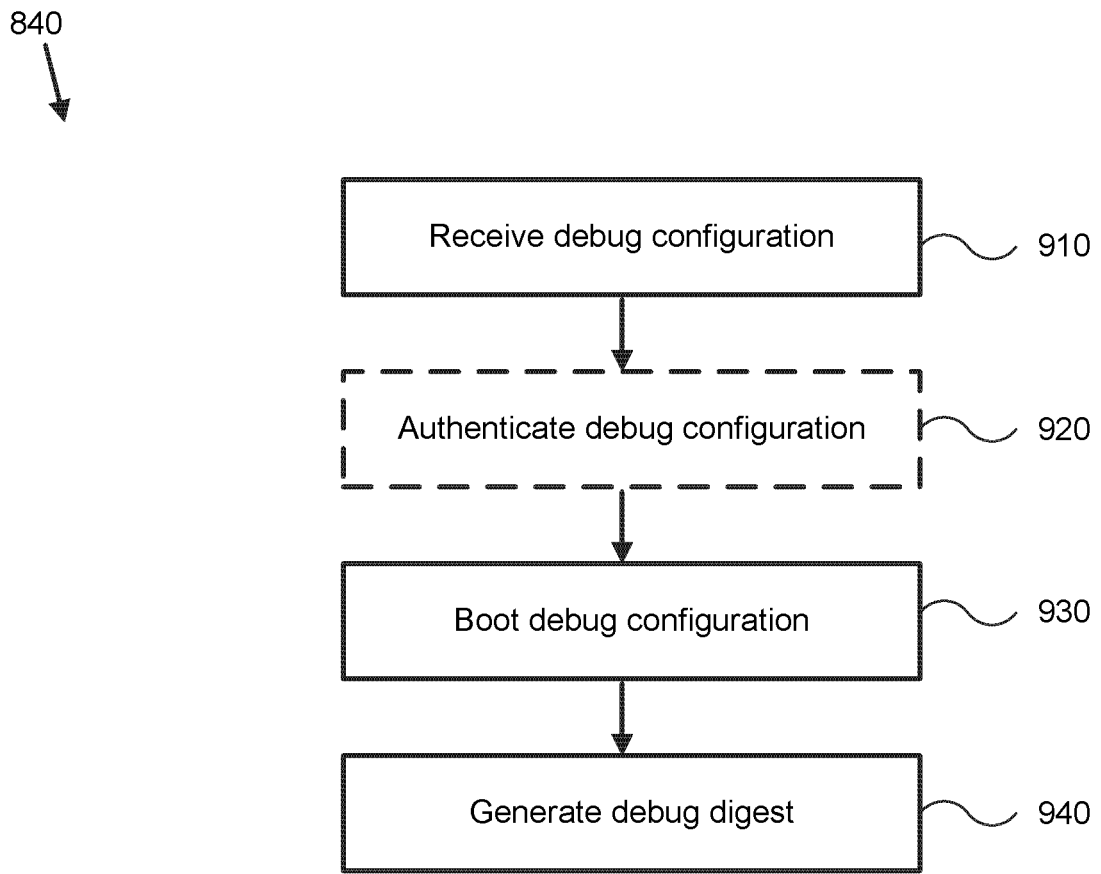
FIG. 9 illustrates a failure characterization process for a locked secure PLD in accordance with an embodiment of the disclosure.

FIG. 9 illustrates a failure characterization process 840 for a locked secure PLD 410 in accordance with an embodiment of the disclosure. In various embodiments, failure characterization process 840 of FIG. 9 may generally correspond to block 840 of failure characterization process 800 in FIG. 8.

In some embodiments, the operations of FIG. 9 may be implemented as software instructions executed by one or more logic devices associated with corresponding electronic devices, modules, and/or structures depicted in FIGS. 1-6. More generally, the operations of FIG. 9 may be implemented with any combination of software instructions and/ or electronic hardware (e.g., inductors, capacitors, amplifiers, actuators, or other analog and/or digital components). It should be appreciated that any step, sub-step, sub-process, or block of process 900 may be performed in an order or arrangement different from the embodiments illustrated by FIG. 9. For example, in other embodiments, one or more blocks may be omitted from process 900, and other blocks may be included. Furthermore, block inputs, block outputs, various sensor signals, sensor information, calibration parameters, and/or other operational parameters may be stored to one or more memories prior to moving to a following portion of process 900. Although process 900 is described with reference to systems, devices, and elements of FIGS. 1-6, process 900 may be performed by other systems, devices, and elements, and including a different selection of electronic systems, devices, elements, assemblies, and/or arrangements. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 910, a logic device receives a debug configuration. For example, configuration engine 440 and/or PLD fabric 400 of a secure PLD 410 erased and/or nullified by execution of the authenticated FC command in block 830 of FIG. 8 may be configured to receive a debug configuration (e.g., issued/generated by an external system 130 and/or HSM 526 of secure PLD customer 510 or secure PLD manufacturer 520 coupled to secure PLD 410 over configuration I/O 448) configured to be stored in NVM 450 and loaded, booted, and executed by PLD fabric 400 and/or other elements of secure PLD 410 to debug operation of any one or more elements of secure PLD 410 and thereby characterize a failure of any one or combination of elements of secure PLD 410.

For example, in some embodiments, such debug configuration may be configured to cause PLD fabric 400 to implement a signal or data generator configured to operate at one or more selected clock speeds of PLD fabric 400 and provide one or more known signals or data to elements of secure PLD 410 to elicit corresponding expected responses, to provide such signals or data to elements of secure PLD 410 and monitor the corresponding actual responses, and to compare the actual responses to the expected responses to generate a debug digest identifying one or more failed comparisons and/or characteristics of such comparisons. More generally, such debug configuration may be configured to identify and/or characterize failures in the operation of any one or combination of elements of secure PLD 410, and may be performed in combination with an external debug application (e.g., executed by external system 130 coupled to secure PLD 410 over configuration I/O 448) configured to help generate a debug digest identifying and/or characterizing such failures in the operation of secure PLD 410. In various embodiments, a debug configuration may be signed (e.g., by a factory private key stored in HSM 526) prior to being provided to secure PLD 410, for example, and/or may include a trace ID corresponding to the specific secure PLD 410 to be debugged.

In optional block 920, a logic device authenticates a debug configuration. For example, configuration engine 440 and/or PLD fabric 400 of secure PLD 410 may be configured to authenticate the debug configuration for PLD fabric 400 and/or secure PLD 410 received in block 910. In some embodiments, secure PLD 410 may be configured to retrieve a security function or feature and/or one or more keys from NVM 450 (e.g., residing in sectors not erased or nullified by an executed FC command) and use such security functions, features, and or keys to authenticate the debug configuration received in block 910. In embodiments where the debug configuration is signed by a factory private key of secure PLD manufacturer 520, secure PLD 410 may be configured to authenticate the signed debug configuration using a factory public key residing in an un-erased/un-nullified portion of NVM 450 (e.g., in MFG trim sector 456). In embodiments where the debug configuration includes a trace ID, secure PLD 410 may be configured to compare the trace ID in the debug configuration to a trace ID stored in NVM 450 and/or security engine 420. Secure PLD 450 may be configured to only allow booting of a received debug configuration, or any configuration received after execution of an authenticated FC command (e.g., in block 830 of FIG. 8), if the debug configuration is signed and authenticated and/or if a trace ID in the debug configuration matches the trace ID stored in NVM 450 and/or security engine 420. In various embodiments, an erased/nullified secure PLD 410 may be configured to check authentication of a received and/or stored debug configuration after each power loss.

In separate embodiments, configuration engine 440 and/or PLD fabric 400 of secure PLD 410 may be configured to authenticate a coupled external system 130 over configuration I/O 448 prior to allowing external system 130 to provide a debug or any other configuration over configuration I/O 448. For example, configuration engine 440 and/or PLD fabric 400 of secure PLD 410 may be configured to receive an authentication message, separate from and prior to receiving the debug configuration in block 910, where the authentication message includes a trace ID and/or other information signed by a factory key corresponding to secure PLD manufacturer 520 and/or encrypted using a device public key corresponding to secure PLD 410 (e.g., with the corresponding device private key stored in NVM 450). Secure PLD 450 may be configured to authenticate the authentication message using the factory public key, trace ID, and/or device private key, as described herein, and then to allow external system 130 to provide a debug configuration over configuration I/O 448. Such debug configuration may itself include the trace ID, be signed, and/or be encrypted, to facilitate further authentication, as described herein.

In block 930, a logic device boots a debug configuration. For example, configuration engine 440 and/or PLD fabric 400 of secure PLD 410 may be configured to load, boot, and/or execute the debug configuration for PLD fabric 400 and/or secure PLD 410 received in block 910 and/or authenticated in optional block 920. In various embodiments, such booting may take place upon receiving the debug configuration in block 910 and/or upon optionally authenticating the received debug configuration, as described with respect to optional block 920. Such booting may include signaling external system 130 of the booting of the received debug configuration so as to initiate a complementary execution of a debug application by external system 130, as described herein.

In block 940, a logic device generates a debug digest. For example, configuration engine 440 and/or PLD fabric 400 of a secure PLD 410 may be configured to generate a debug digest based on execution of the debug configuration for PLD fabric 400 and/or secure PLD 410 booted in block 930. In some embodiments, such debug digest may include a listing of failures of secure PLD 410 and/or of elements of secure PLD 410, characterizations of such failures, and/or other debug information associated with execution of the debug configuration received in block 910. In some embodiments, secure PLD 410 may be configured to generate and provide such debug digest to external system 130 over configuration I/O 448, for example, where the debug digest includes debug information determined by secure PLD 410. In other embodiments, secure PLD 410 may be configured to provide failure information to external system 130, and external system 130 may be configured to monitor operation of secure PLD 410 (e.g., over configuration I/O 448 and/or programmable I/O 404) and generate the debug digest at least partially externally to secure PLD 410.

In various embodiments, secure PLD 410 and/or external system 130 may be configured to determine an updated MFG trim based on the debug digest that is configured to mitigate or eliminate failures identified and/or characterized in the debug digest. Such updated MFG trim may be stored in and/or overwrite MFG trim sector 456 in NVM 450, for example, to reconfigure secure PLD 410 to operate without failures. In some embodiments, such failure characterization/debug process may be performed iteratively, with multiple updated MFG trims, to converge to an acceptable MFG trim that eliminates detectable failures in operation of secure PLD 410 and converts secure PLD 410 into a validated secure PLD 410. Upon completion of execution of the debug configuration, generation of the debug digest, and/or updating of the MFG trim, secure PLD 410 may be re-provisioned (e.g., per optional block 850 of failure characterization process 800) or orphaned or otherwise destroyed, as desired and/or dictated by the debug results, as identified in the generated debug digest.

Thus, by employing the systems and methods described herein, embodiments of the present disclosure are able to provide flexible, secure, and accurate failure characterization of a secure PLD across a customer order of secure PLDs. A customer locked and/or otherwise provisioned secure PLD exhibiting a failure may be securely erased and provided back to the manufacturer for failure characterization and/or repair (e.g., retrim) to help the customer identify a failure mode of the secure PLD and/or an integrated user device without risking exposure of customer data. Moreover, failures in the secure PLD may be characterized and/or debugged without risking the post-debugged secure PLD being generally programmable by a third party without access to a factory private key and/or permission by at least secure PLD manufacturer 520, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A secure programmable logic device (PLD) failure characterization system, comprising:
   a secure PLD, wherein the secure PLD comprises a plurality of programmable logic blocks (PLBs) arranged in a PLD fabric of the secure PLD, and a configuration engine configured to program the PLD fabric according to a configuration image stored in a non-volatile memory (NVM) of the secure PLD and/or coupled through a configuration input/output (I/O) of the secure PLD to the configuration engine, wherein the secure PLD is configured to perform a computer-implemented method comprising:
   receiving a failure characterization (FC) command from the PLD fabric or an external system coupled to the secure PLD through the configuration I/O;
   executing the FC command, wherein the executing the FC command comprises erasing and/or nullifying at least a portion of the NVM of the secure PLD to remove customer data associated with the configuration image;
   loading a debug configuration into the PLD fabric while the portion of the NVM remains erased and/or nullified; and
   performing a debug process, wherein the performing the debug process comprises booting the debug configuration by the PLD fabric that is configured to identify and/or characterize failures in the operation of any one or combination of elements of the secure PLD.

2. The secure PLD failure characterization system of claim 1, wherein the computer-implemented method further comprises:
   authenticating the received FC command prior to the executing the FC command, wherein the FC command is signed using an application private key associated with a secure PLD customer for the secure PLD, a corresponding application public key is stored in the NVM, and the authenticating comprises using the application public key to verify that the FC command is signed using the application private key associated with the secure PLD customer.

3. The secure PLD failure characterization system of claim 1, wherein the computer-implemented method further comprises:
   authenticating the received FC command prior to the executing the FC command, wherein the FC command comprises an FC trace ID, a trace ID associated the secure PLD is stored in the NVM, and the authenticating comprises comparing the FC trace ID with the trace ID stored in the NVM.

4. The secure PLD failure characterization system of claim 1, wherein the NVM comprises rewritable and/or unlocked sectors, and wherein the executing the authenticated FC command comprises:
   erasing individual sectors of the NVM according to a prioritized erase order, wherein the prioritized erase order comprises user flash memory sectors, image sectors, security and/or other features stored in securable storage sectors, device key sectors, and lock policy sectors.

5. The secure PLD failure characterization system of claim 1, wherein the NVM comprises one time programmable sectors, and wherein the executing the authenticated FC command comprises:
   nullifying individual sectors of the NVM according to a prioritized erase order, wherein the nullifying comprises setting all bits within a particular sector to "1," and wherein the prioritized erase order comprises user flash memory sectors, image sectors, security and/or other features stored in securable storage sectors, device key sectors, and lock policy sectors.

6. The secure PLD failure characterization system of claim 1, wherein the performing the debug process comprises:
   receiving a debug configuration over the configuration I/O;
   loading, booting, and/or executing the received debug configuration in the PLD fabric; and
   generating a debug digest associated with the debug configuration, wherein the debug digest comprises a listing of failures and/or other debug information associated with execution of the debug configuration by the PLD fabric.

7. The secure PLD failure characterization system of claim 6, wherein the performing the debug process further comprises:
   authenticating the debug configuration prior to the loading, booting, and/or executing the received debug configuration in the PLD fabric; and
   providing the debug digest to an external system coupled to the secure PLD over the configuration I/O.

8. The secure PLD failure characterization system of claim 1, wherein the computer-implemented method further comprises re-provisioning the secure PLD after the performing the debug process, and wherein the re-provisioning the secure PLD comprises:
receiving a programming private key, a programming secret, and an initial programming image (IPI) configuration over the configuration I/O of the secure PLD storing the IPI configuration in the NVM; and
programming the PLD fabric of the secure PLD according to the IPI configuration.

9. The secure PLD failure characterization system of claim 1, further comprising:
an external system comprising a processor and a memory and configured to be coupled to the secure PLD through the configuration input/output (I/O) of the secure PLD, wherein the memory comprises machine-readable instructions which when executed by the processor of the external system are adapted to cause the external system to:
provide a debug configuration to the secure PLD over the configuration I/O;
receive a debug digest from the secure PLD associated with booting and/or execution of the debug configuration by the PLD fabric of the secure PLD;
determine an updated manufacturer trim based, at least in part, on the received debug digest; and
provide the updated manufacturer trim to the secure PLD over the configuration I/O.

10. The secure PLD failure characterization system of claim 1, further comprising:
an external system comprising a processor and a memory and configured to be coupled to the secure PLD through the configuration input/output (I/O) of the secure PLD, wherein the memory comprises machine-readable instructions which when executed by the processor of the external system are adapted to cause the external system to:
generate or receive a protected configuration for the secure PLD; and
program the secure PLD according to the protected configuration;
wherein the protected configuration comprises an application configuration and a feature configuration, each signed by an application private key associated with a secure PLD customer and encrypted by an application encryption key associated with the secure PLD customer, and a programming key digest comprising an encrypted and signed combination of an application public key, the application encryption key, and a programming secret associated with the secure PLD customer.

11. A secure programmable logic device (PLD) failure characterization system, comprising:
an external system comprising a processor and a memory and configured to be coupled to a secure PLD through a configuration input/output (I/O) of the secure PLD, wherein the memory comprises machine-readable instructions which when executed by the processor of the external system are adapted to cause the external system to perform a computer-implemented method comprising:
providing a failure characterization (FC) command and/or a debug configuration to the secure PLD over the configuration I/O; and
receiving a debug digest from the secure PLD associated with booting and/or execution of the debug configuration by a PLD fabric of the secure PLD;
determining an updated manufacturer trim based, at least in part, on the received debug digest; and
providing the updated manufacturer trim to the secure PLD over the configuration I/O.

12. The secure PLD failure characterization system of claim 11, further comprising:
the secure PLD, wherein the secure PLD comprises a plurality of programmable logic blocks (PLBs) arranged in the PLD fabric of the secure PLD, a configuration engine configured to program the PLD fabric according to a configuration image stored in a non-volatile memory (NVM) of the secure PLD and/or coupled through the configuration input/output (I/O) to the configuration engine, and a security engine configured to provide a plurality of security functions for the PLD fabric and/or the configuration engine, wherein the secure PLD is configured to perform a secure PLD-implemented method comprising:
receiving the FC command from the external system coupled to the secure PLD through the configuration I/O;
authenticating the received FC command using one or more security functions of the security engine of the secure PLD, wherein the authenticating comprises using an application public key stored in the NVM to verify that the FC command is signed using an application private key associated with a secure PLD customer for the secure PLD; and
executing the FC command, wherein the executing the FC command comprises erasing and/or nullifying at least a portion of the NVM of the secure PLD; and
performing a debug process corresponding to the debug configuration provided by the external system, wherein the performing the debug process comprises generating a debug digest comprising debug information identifying and/or characterizing failures in the operation of any one or combination of elements of the secure PLD.

13. A method for failure characterization of a secure programmable logic device (PLD), the method comprising:
receiving a failure characterization (FC) command from a PLD fabric or an external system coupled to a secure PLD through a configuration I/O of the secure PLD;
executing the FC command, wherein the executing the FC command comprises erasing and/or nullifying at least a portion of the NVM of the secure PLD to remove customer data associated with the configuration image;
loading a debug configuration into the PLD fabric while the portion of the NVM remains erased and/or nullified; and
performing a debug process, wherein the performing the debug process comprises booting the debug configuration by the PLD fabric that is configured to identify and/or characterize failures in the operation of any one or combination of elements of the secure PLD.

14. The method of claim 13, further comprising:
authenticating the received FC command prior to the executing the FC command, wherein the FC command is signed using an application private key associated with a secure PLD customer for the secure PLD, a corresponding application public key is stored in the NVM, and the authenticating comprises using the application public key to verify that the FC command is signed using the application private key associated with the secure PLD customer.

15. The method of claim 13, further comprising:
authenticating the received FC command prior to the executing the FC command, wherein the FC command comprises an FC trace ID, a trace ID associated the secure PLD is stored in the NVM, and the authenticating comprises comparing the FC trace ID with the trace ID stored in the NVM.

16. The method of claim 13, wherein the NVM comprises rewritable and/or unlocked sectors, and wherein the executing the authenticated FC command comprises:
erasing individual sectors of the NVM according to a prioritized erase order, wherein the prioritized erase order comprises user flash memory sectors, image sectors, security and/or other features stored in securable storage sectors, device key sectors, and lock policy sectors.

17. The method of claim 13, wherein the NVM comprises one time programmable sectors, and wherein the executing the authenticated FC command comprises:
nullifying individual sectors of the NVM according to a prioritized erase order, wherein the nullifying comprises setting all bits within a particular sector to "1," and wherein the prioritized erase order comprises user flash memory sectors, image sectors, security and/or other features stored in securable storage sectors, device key sectors, and lock policy sectors.

18. The method of claim 13, wherein the performing the debug process comprises:
receiving a debug configuration over the configuration I/O;
loading, booting, and/or executing the received debug configuration in the PLD fabric; and
generating a debug digest associated with the debug configuration, wherein the debug digest comprises a listing of failures and/or other debug information associated with execution of the debug configuration by the PLD fabric.

19. The method of claim 18, wherein the performing the debug process further comprises:
authenticating the debug configuration prior to the loading, booting, and/or executing the received debug configuration in the PLD fabric; and
providing the debug digest to an external system coupled to the secure PLD over the configuration I/O.

20. The method of claim 13, further comprising re-provisioning the secure PLD after the performing the debug process, wherein the re-provisioning the secure PLD comprises:
receiving a programming private key, a programming secret, and an initial programming image (IPI) configuration over the configuration I/O of the secure PLD
storing the IPI configuration in the NVM; and
programming the PLD fabric of the secure PLD according to the IPI configuration.

* * * * *